(12) United States Patent
Wada

(10) Patent No.: US 8,510,451 B2
(45) Date of Patent: Aug. 13, 2013

(54) SESSION MANAGEMENT SYSTEM AND METHOD OF CONTROLLING THE SAME

(75) Inventor: Katsuhiro Wada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 312 days.

(21) Appl. No.: 12/418,345

(22) Filed: Apr. 3, 2009

(65) Prior Publication Data

US 2009/0254664 A1    Oct. 8, 2009

(30) Foreign Application Priority Data

Apr. 4, 2008  (JP) ................................. 2008-098363
Jan. 8, 2009  (JP) ................................. 2009-002433

(51) Int. Cl.
*G06F 15/16* (2006.01)

(52) U.S. Cl.
USPC .............................. 709/227; 709/222; 709/228

(58) Field of Classification Search
USPC ........................... 709/223, 225, 227, 228, 229
See application file for complete search history.

(56) References Cited

U.S. PATENT DOCUMENTS

| | | | |
|---|---|---|---|
| 6,832,255 B1 | 12/2004 | Rumsewicz et al. | |
| 7,103,667 B1 * | 9/2006 | Bell et al. | 709/227 |
| 7,117,266 B2 * | 10/2006 | Fishman et al. | 709/228 |
| 2002/0087722 A1 * | 7/2002 | Datta et al. | 709/239 |
| 2003/0126252 A1 * | 7/2003 | Abir | 709/223 |
| 2003/0182429 A1 * | 9/2003 | Jagels | 709/227 |
| 2005/0091388 A1 * | 4/2005 | Kamboh et al. | 709/228 |
| 2006/0221977 A1 | 10/2006 | Basso et al. | |
| 2007/0061434 A1 | 3/2007 | Schmieder et al. | |
| 2008/0082650 A1 * | 4/2008 | Takata et al. | 709/223 |

FOREIGN PATENT DOCUMENTS

| | | |
|---|---|---|
| JP | 10-177548 A | 6/1998 |
| WO | 99/55040 A1 | 10/1999 |

OTHER PUBLICATIONS

Extended European Search Report issued in corresponding European Patent Application No. 09156871.7 dated Mar. 3, 2010.

* cited by examiner

*Primary Examiner* — Mohamed Ibrahim
(74) *Attorney, Agent, or Firm* — Rossi, Kimms & McDowell LLP

(57) ABSTRACT

A session management system enabling network resources to be efficiently utilized or saved when communication addresses are assigned to a network interface. The system manages sessions between a server having a plurality of addresses and a client. It is determined, in a case where an application provided with the client requests to communicate with the server, whether or not a session in which an address different from an address designated by the application is used is already established between the client and the server. The application is caused to communicate with the server by using the already established session when it is determined that the session is already established, and communicate with the server by using a newly established session when it is determined that the session is not established.

8 Claims, 35 Drawing Sheets

FIG.5

| MANAGEMENT NUMBER | APPLICATION IDENTIFIER | REQUEST ADDRESS INFORMATION | | COMMUNICATION ADDRESS INFORMATION | | SERVER IDENTIFIER | SESSION NUMBER |
|---|---|---|---|---|---|---|---|
| | | IP ADDRESS | PORT NUMBER | IP ADDRESS | PORT NUMBER | | |
| 1 | APPLICATION 1 | 10.0.0.10 | 1025 | 10.0.0.10 | 1025 | 10 | 1 |
| 2 | APPLICATION 1 | 2001::10 | 1025 | 10.0.0.10 | 1025 | 10 | 1 |
| 3 | APPLICATION 1 | 10.0.0.20 | 1025 | 10.0.0.20 | 1025 | 20 | 2 |
| 4 | APPLICATION 2 | 10.0.0.10 | 1025 | 10.0.0.10 | 1025 | 10 | 1 |
| ... | ... | ... | ... | ... | ... | ... | ... |

501  502a  502b  502  503a  503b  503  504  505

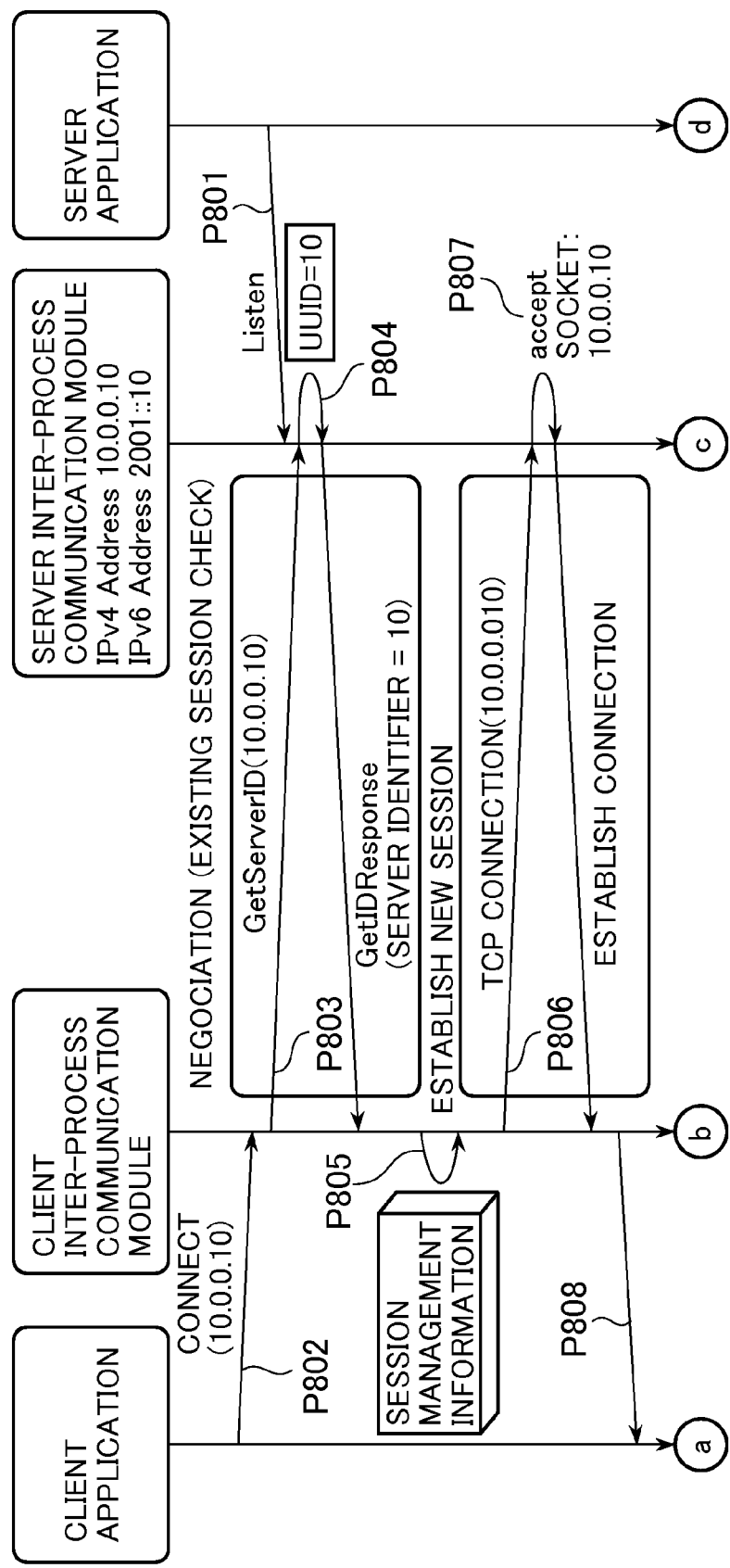

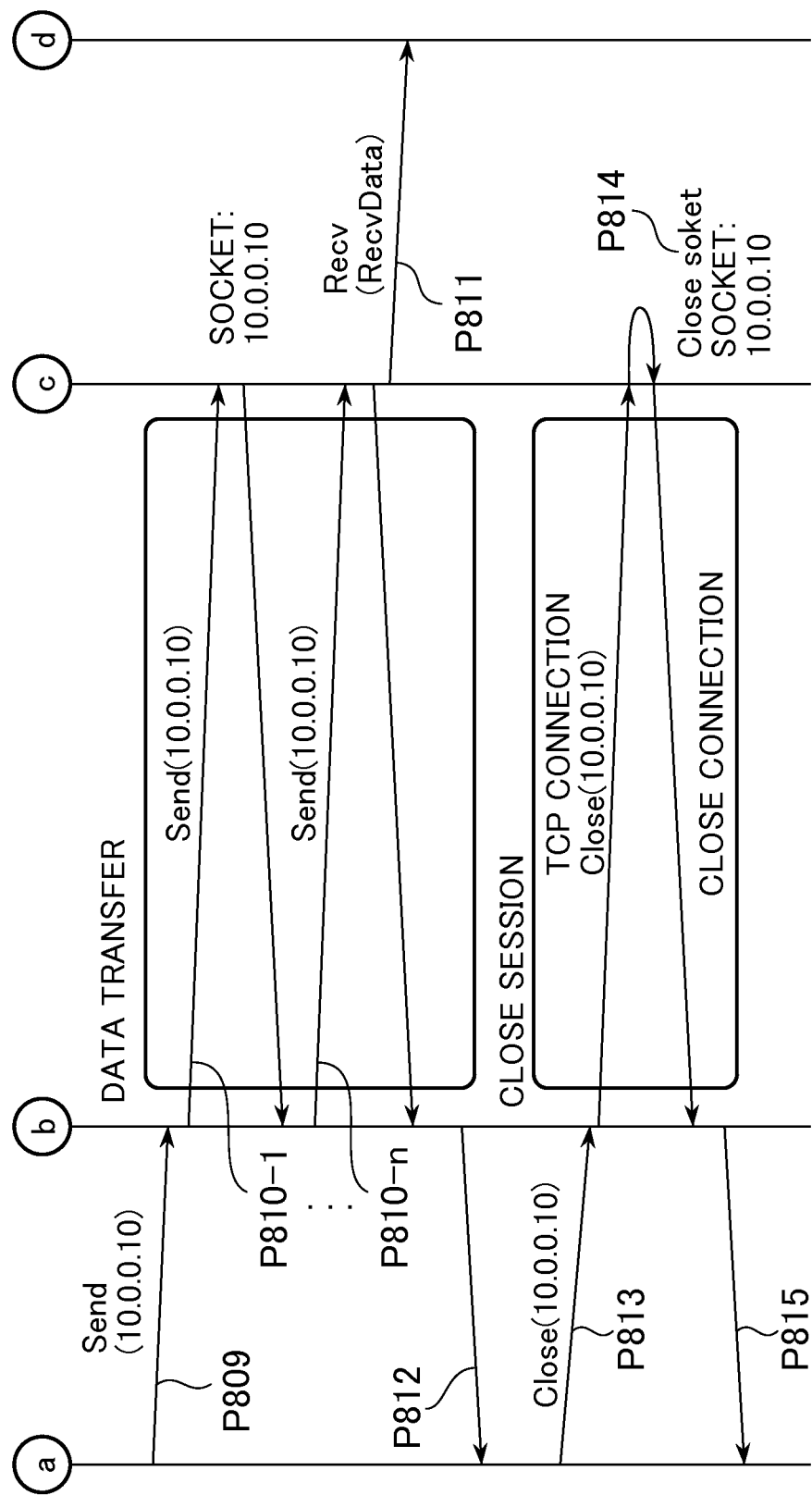

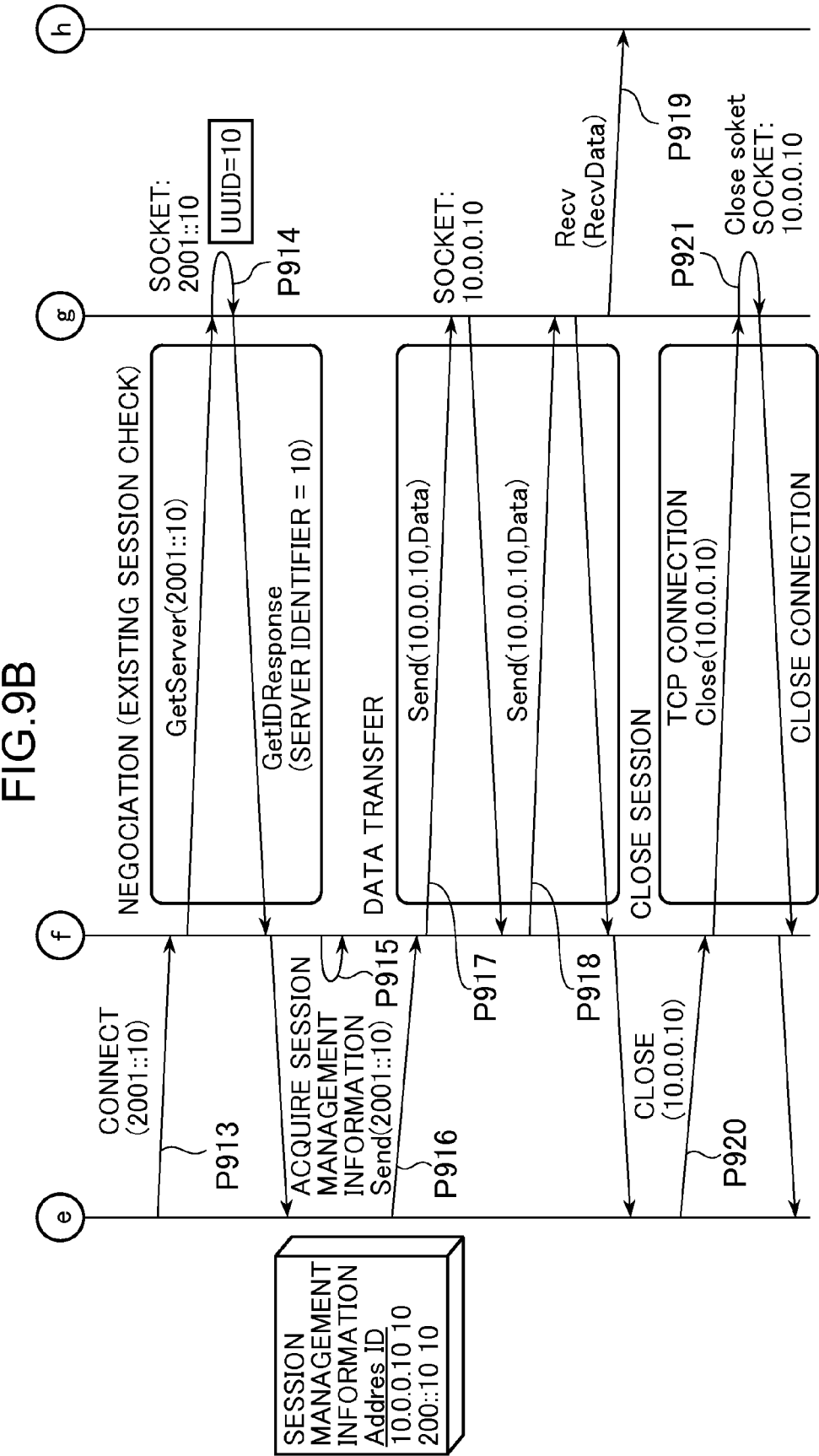

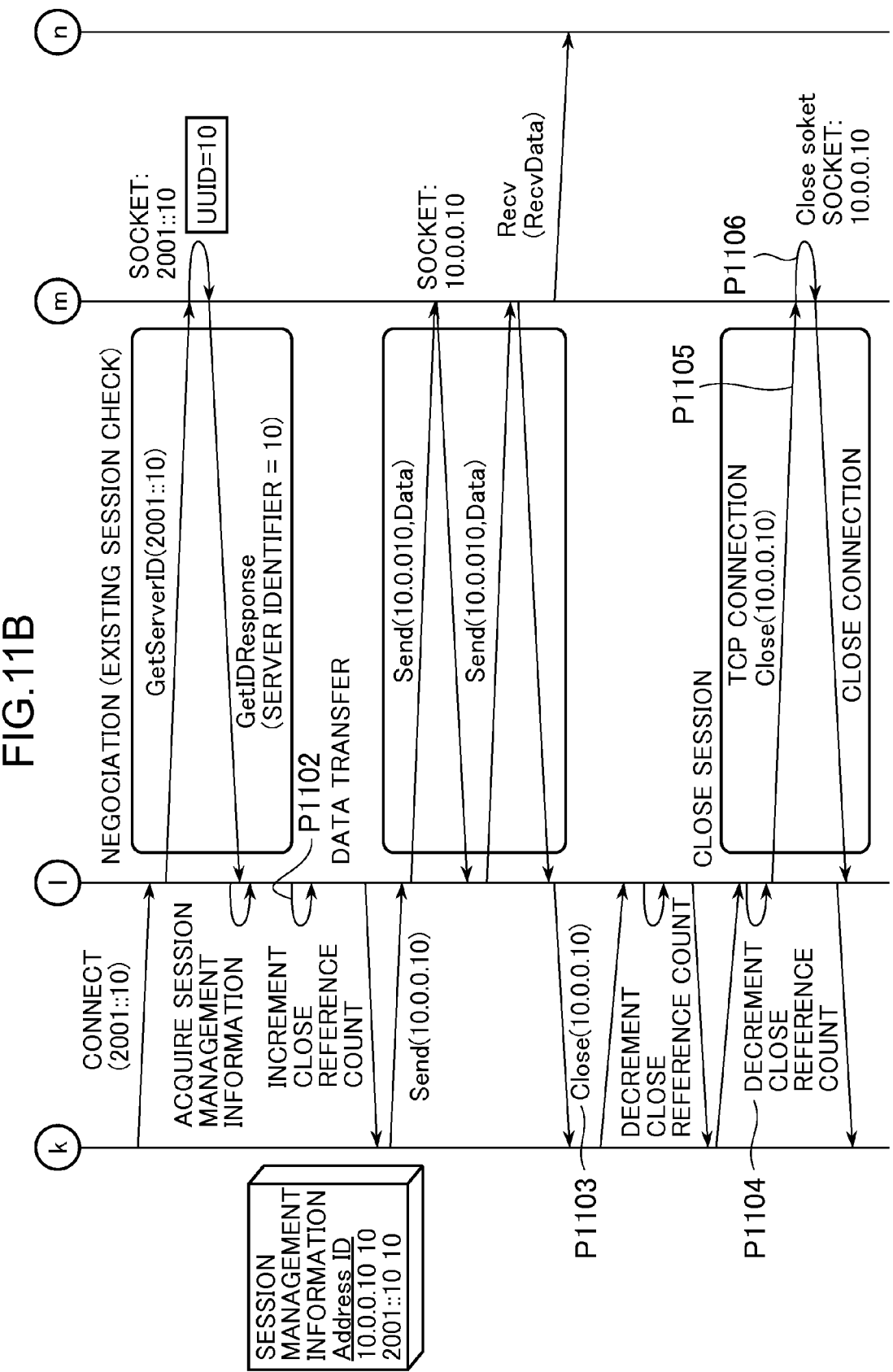

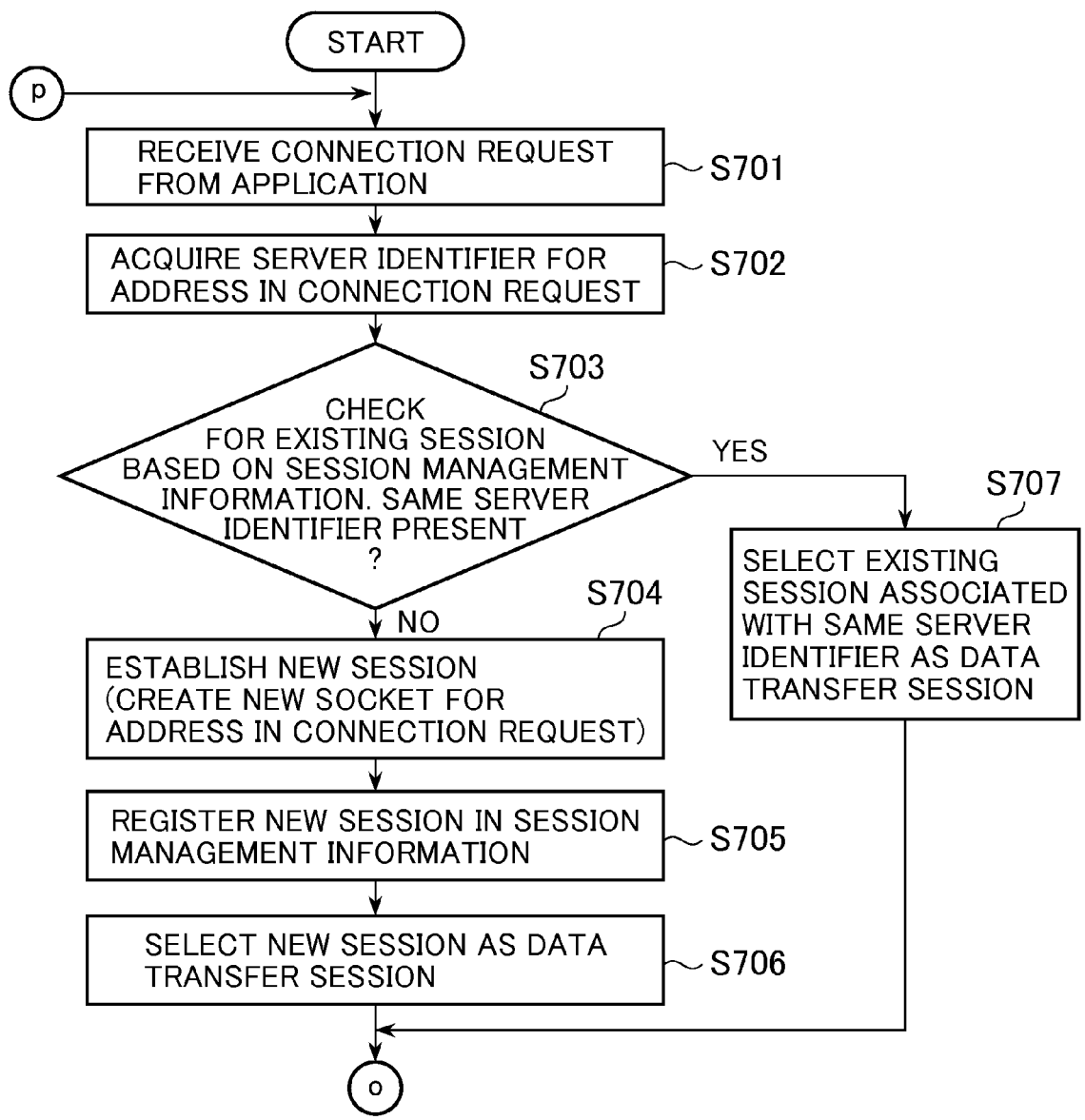

FIG.16

| | SERVER IDENTIFIER | ADDRESS ACQUISITION METHOD | ADDRESS TYPE | IP ADDRESS |
|---|---|---|---|---|
| 1 | AppServer | DNS/A RECORD | IPv4 | 10.0.0.10 |
| 2 | AppServer | DNS/AAAA RECORD | IPv6 | 2001::10 |
| 3 | AppServer | LLNMR | IPv6 | fe80::10 |
| 4 | AppServer | NetBIOS BROADCAST | IPv4 | 10.0.0.10 |
| 5 | AppServer2 | DNS/A RECORD | IPv4 | 10.0.0.20 |
| 6 | AppServer2 | DNS/A RECORD | IPv6 | 2001::20 |

| MANAGEMENT NUMBER | APPLICATION IDENTIFIER | REQUEST ADDRESS INFORMATION | | COMMUNICATION ADDRESS INFORMATION | | SERVER IDENTIFIER | SESSION NUMBER |
|---|---|---|---|---|---|---|---|
| | | IP ADDRESS | PORT NUMBER | IP ADDRESS | PORT NUMBER | | |
| 1 | APPLICATION 1 | 10.0.0.10 | 1025 | 10.0.0.10 | 1025 | AppServer | 1 |
| 2 | APPLICATION 1 | 2001::10 | 1025 | 10.0.0.10 | 1025 | AppServer | 1 |
| 3 | APPLICATION 2 | AppServer | 1025 | 10.0.0.10 | 1025 | AppServer | 1 |
| 4 | APPLICATION 1 | f80::10 | 1025 | 10.0.0.10 | 1025 | AppServer | 1 |
| 5 | APPLICATION 2 | AppServer2 | 1025 | 10.0.0.20 | 1025 | AppServer2 | 2 |

FIG.23

| | SERVER IDENTIFIER | ADDRESS ACQUISITION METHOD | ADDRESS TYPE | IP ADDRESS |
|---|---|---|---|---|
| 1 | AppServer.foo.test | DNS/A RECORD | IPv4 | 10.0.0.10 |
| 2 | AppServer.foo.test | DNS/AAAA RECORD | IPv6 | fe80::10 |
| 3 | AppServer | LLNMR | IPv6 | fe80::10 |
| 4 | AppServer | LLNMR | IPv6 | 2001::10 |
| 5 | | | | |

| MANAGEMENT NUMBER | APPLICATION IDENTIFIER 501 | REQUEST ADDRESS INFORMATION 502 | | COMMUNICATION ADDRESS INFORMATION 503 | | SERVER IDENTIFIER 504 | LINE INFORMATION 2501 | | | SESSION NUMBER 505 |
|---|---|---|---|---|---|---|---|---|---|---|
| | | IP ADDRESS 502a | PORT NUMBER 502b | IP ADDRESS 503a | PORT NUMBER 503b | | BAND INFORMATION 2501a | ROUTER COUNT 2501b | Path MTU 2501c | |
| 1 | APPLICATION 1 | 2001::20 | 1025 | 200::10 | 1025 | 10 | 100Mbps | 3 | 1500 | 1 |
| 2 | APPLICATION 1 | 2001::10 | 1025 | 200::10 | 1025 | 10 | 1Gbps | 1 | 9000 | 1 |
| 3 | APPLICATION 1 | 10.0.0.20 | 1025 | 10.0.0.20 | 1025 | 20 | 100Mbps | 1 | 1500 | 2 |
| 4 | APPLICATION 2 | 10.0.0.10 | 1025 | 200::10 | 1025 | 10 | 100Mbps | 5 | 1500 | 1 |
| | | | | | | | | | | |

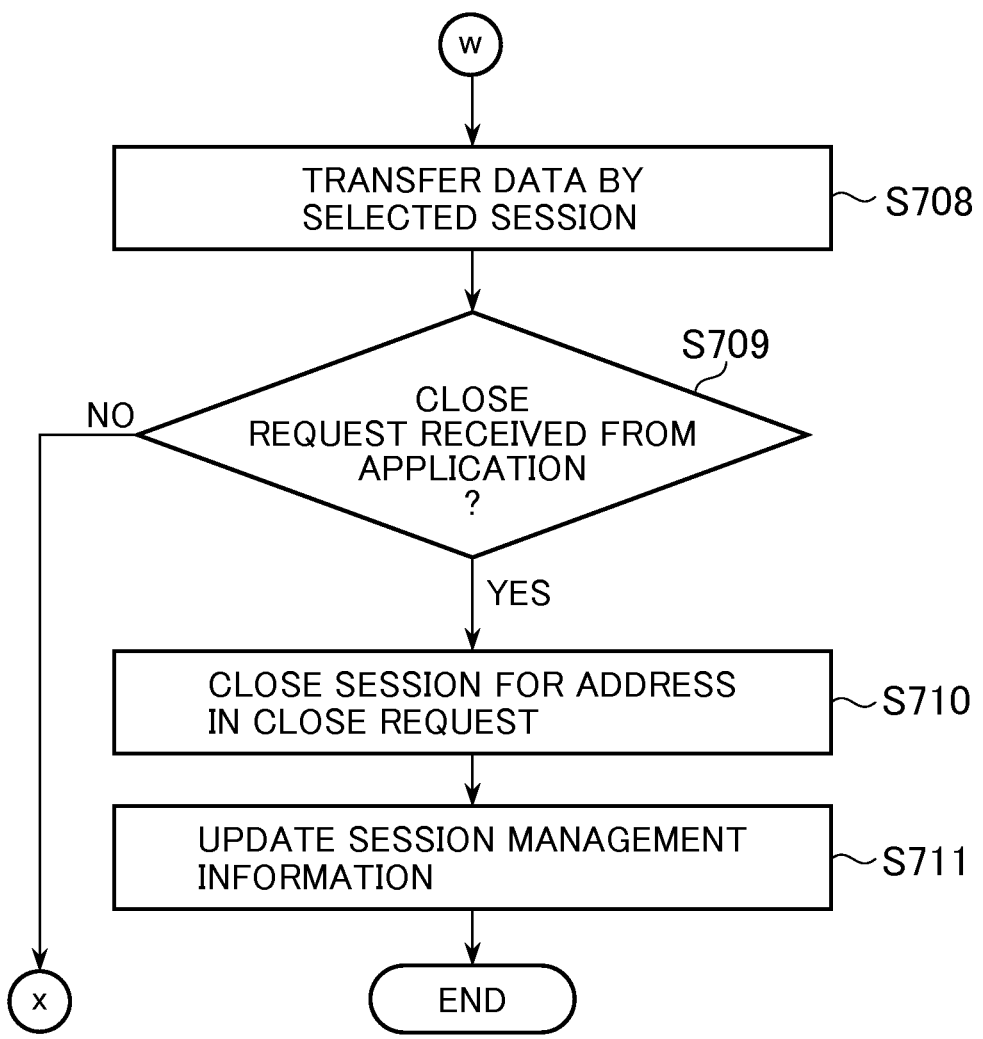

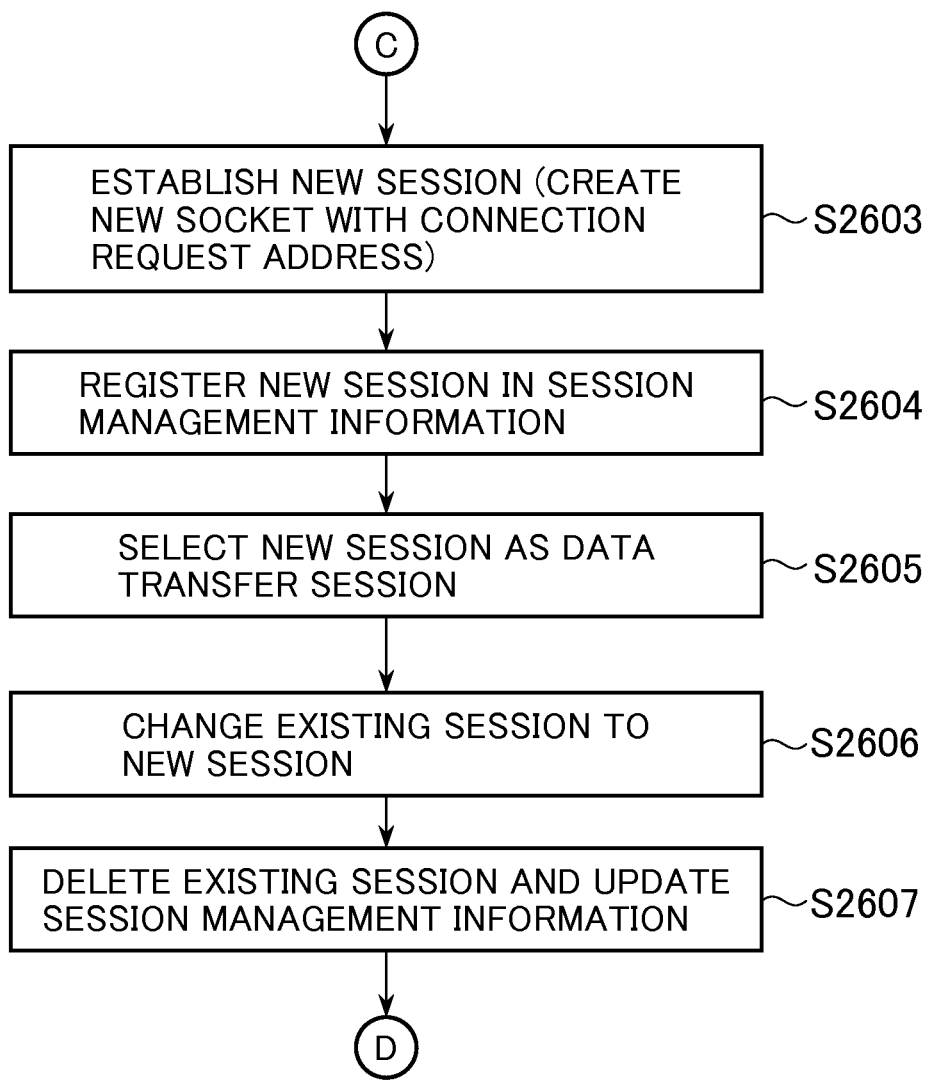

SESSION MANAGEMENT SYSTEM AND METHOD OF CONTROLLING THE SAME

BACKGROUND OF THE INVENTION

1. Field of the Invention

The present invention relates to a technique for managing a session indicative of a logical connection relationship in communication between applications.

2. Description of the Related Art

Conventionally, various kinds of information processing apparatuses including PCs (personal computers), printers, and MFPs (Multi-Function Peripherals) have been known as communication apparatuses for use on a network (an intranet, such as a LAN (Local Area Network) or the Internet).

Today, IP protocols are widely used among information processing apparatuses connected to a network, and under the IP protocols, a unique IP address (communication address) is assigned to each information processing apparatus, whereby connected apparatuses are identified from each other.

In general, under the conventional IP protocols (IPv4 (IP version 4)), a single IP address is assigned to a single network interface as an IP address for identifying one information processing apparatus from others.

On the other hand, under IPv6 (IP version 6), which is recently coming into widespread use, a terminal apparatus communicates with a router upon connection to the same to automatically acquire an IP address. Further, to enable communication even when no router exists, an IPv6 address is assigned on a network interface basis, in addition to the IP address.

Further, a DHCP (Dynamic Host Configuration Protocol) server sometimes exists. In an environment where IPv6 is employed, a plurality of IPv6 addresses are assigned to a single network interface as mentioned above. As a consequence, in an information processing apparatus supporting IPv6, a single network interface is assigned an IPv4 address and a plurality of IPv6 addresses.

In a case where information processing apparatuses communicate with each other, a network socket of a sender of transmission and that of a destination of transmission, i.e. pairs of an IP address and a port number are created. The processing for creating a network socket consumes memory space as the network resource of each information processing apparatus and CPU processing time thereof.

For this reason, a server connected to numerous information processing apparatuses for communication consumes its network resource corresponding in amount to the number of the connections. On the other hand, the amount of network resource available to a printer, an MFP, or the like information processing apparatus is smaller than that of the network resource available to the server, and therefore the number of communication apparatuses that can be connected to the information processing apparatus at the same time is also smaller.

Further, in TCP communication in which a time period taken before opening a network socket is set longer than in UDP communication irrespective of data size, the number of simultaneous connections that can be established per unit time is limited to a smaller value than in UDP communication, and hence a deluge of requests from clients causes a connection error in the server.

To solve this problem, there has been proposed a technique which makes it possible to save network resource in a case where a plurality of applications provided in a client in a client-server system establish a plurality of sessions with a server assigned an identical address, for communication therewith (see Japanese Patent Laid-Open Publication No. H10-177548).

However, when a plurality of IPv6 addresses are assigned to a single network interface, the technique disclosed in Japanese Patent Laid-Open Publication No. H10-177548 is not capable of saving network resource consumed for establishing connections to a plurality of server addresses even in communication with the same server.

SUMMARY OF THE INVENTION

The present invention provides a session management system, and a method of controlling the same.

In a first aspect of the present invention, there is provided a session management system for managing sessions between a server having a plurality of addresses and a client, comprising a determining unit configured to determine, in a case where an application provided with the client requests to communicate with the server, whether or not a session in which an address different from an address designated by the application is used is already established between the client and the server, and a control unit configured to cause the application to communicate with the server by using the already established session when it is determined that the session is already established, and to cause the application to communicate with the server by using a newly established session when it is determined that the session is not established.

In a second aspect of the present invention, there is provided a method of controlling a session management system for managing sessions between a server having a plurality of addresses and a client, comprising determining, in a case where an application provided with the client requests to communicate with the server, whether or not a session in which an address different from an address designated by the application is used is already established between the client and the server, causing the application to communicate with the server by using the already established session when it is determined that the session is already established, and causing the application to communicate with the server by using a newly established session when it is determined that the session is not established.

According to the present invention, it is possible to make efficient use of or save network resource when a plurality of communication addresses are assigned to a single network interface.

Further features of the present invention will become more apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 5 is a diagram of an example of session management information (first to seventh (sixth) embodiments).

FIGS. 8A and 8B are sequence diagrams of an example of the processes in FIGS. 6 and 7 (in a case where no existing session is present).

FIGS. 9A and 9B are sequence diagrams of an example of the processes in FIGS. 6 and 7 (in a case where an existing session is present).

FIGS. 11A and 11B are sequence diagrams of the session management process executed between the server PC and the client PC in the second embodiment.

FIGS. 12A and 12B are flowcharts of a session management process executed by the client inter-process communication section of the client PC in the third embodiment of the present invention.

FIG. 16 is a diagram of address list information in the fourth embodiment.

FIG. 17 is a diagram of an example of the session management information in the fourth embodiment.

FIG. 23 is a diagram of an example of address list information in a case where an identical server is designated by different pieces of identification information.

FIG. 25 is a diagram of an example of session management information in the seventh embodiment.

FIGS. 26A and 26B are flowcharts of a session management process executed in the seventh embodiment.

FIG. 27 is a continuation of the flowchart in FIG. 26A.

DETAILED DESCRIPTION OF THE EMBODIMENTS

The present invention will now be described in detail below with reference to the accompanying drawings showing embodiments thereof. It should be noted that the present invention is not limited to embodiments first to seventh embodiments described below. Further, all combinations of features according to the first to seventh embodiments are not absolutely essential to the present invention.

Figure 1:
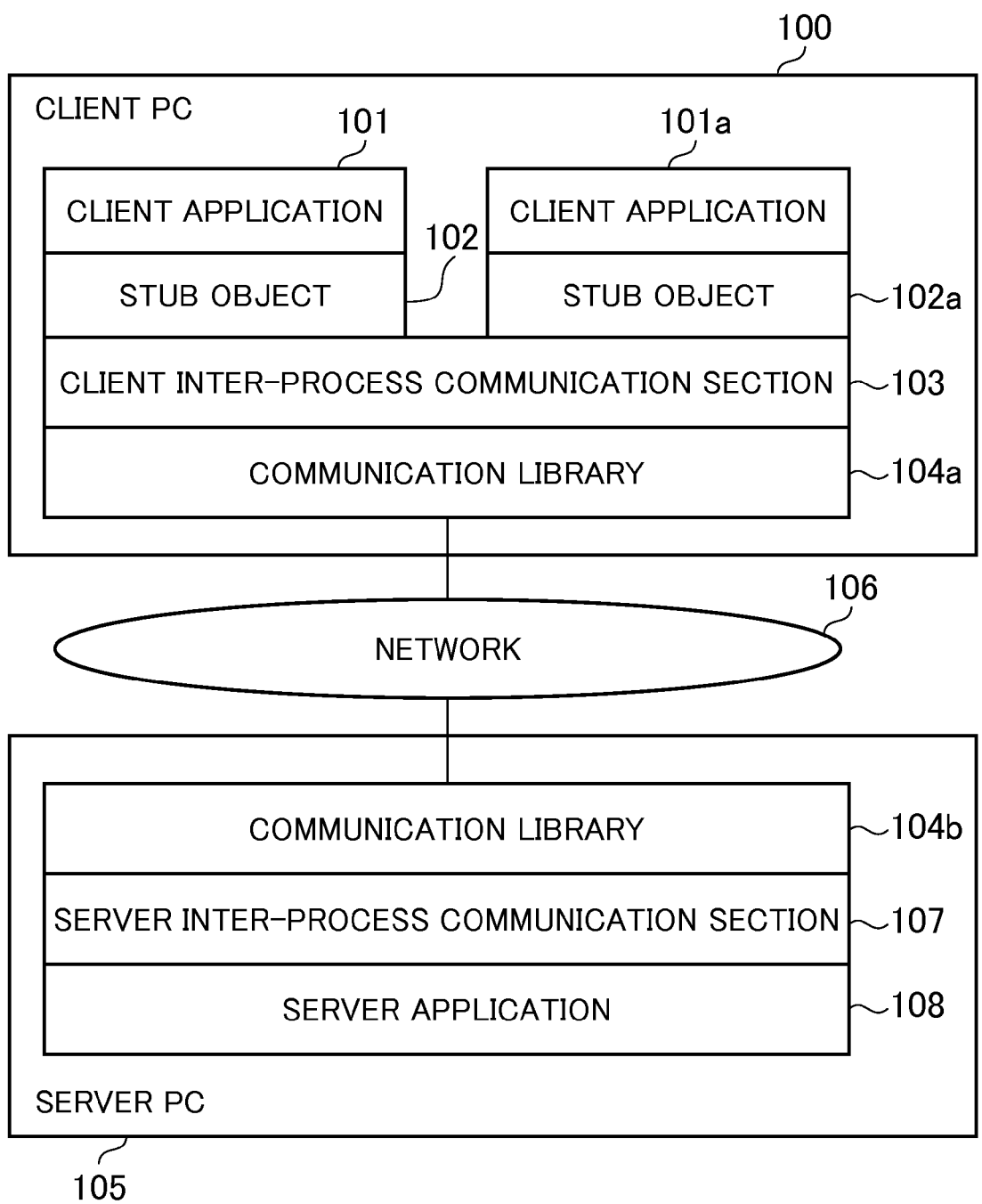
FIG. 1 is a diagram of the software configuration of a client-server system to which is applied a session management system according to first to third and seventh embodiments of the present invention.

FIG. 1 is a diagram of the software configuration of a client-server system to which is applied a session management system according to first to third and seventh embodiments of the present invention.

As shown in FIG. 1, a client PC (client terminal) 100 and a server PC 105 are interconnected via a network 106. In the first to third and seventh embodiments, it is assumed that the network 106 is implemented by a LAN or a WAN, but it is possible to employ a different type of network from the LAN and the WAN. Further, the client PC 100 and the server PC 105 can be connected not by the network 106, but by an interface (cable) defined by the IEEE 1394 or 1284 standard or the like.

In the first to seventh embodiments, it is assumed that the client PC 100 is implemented by a general PC (Personal Computer), but instead of the PC, there may be used a printer or an MFP (multifunction peripheral). That is, features of the first to seventh embodiments can be applied to a wide variety of network communication function-equipped apparatuses, such as a portable information terminal, a scanner, and a facsimile machine.

The client PC 100 incorporates client applications 101 and 101a. The first embodiment can also be applied to a case where the client PC 100 incorporates only one or more than two client applications (this also applies to the second to seventh embodiments).

The client applications 101 and 101a perform communication using stub objects 102 and 102a, respectively. In this case, actual communication processing is carried out by a client inter-process communication section 103.

The client inter-process communication section 103 communicates with the server PC 105 using a communication library 104a of an operating system. Communication performed using the communication library 104a includes not only socket (IP address+port number) communication, but also RPC (Remote Procedure Call), LPC (Local Procedure Call), and communication by Web services or the like.

A server application 108 operates on the server PC 105. The server application 108 performs communication using a server inter-process communication section 107. The server inter-process communication section 107 communicates with the client PC 100 using a communication library 104b, via the network 106. One or more server applications 108 may be provided.

Actual communication processing between the client application 101 or 101a and the server application 108 is executed by the client inter-process communication section 103 and the server inter-process communication section 107, as described above. This actual communication processing includes a session management process involving a series of requests and responses. In other word, the session management process unique to the present invention is executed by the client inter-process communication section 103 and the server inter-process communication section 107.

Although in the client-server system in FIG. 1, the client and the server are each implemented by a PC (Personal computer), the first to third embodiments may be applied to a client-server system comprised of other network devices, communication function-equipped information processing apparatuses, peripheral apparatuses, and so forth. In this case, the system is only required to be configured such that program operations carried out by the client PC 100 or the server PC 105 in the client-server system in FIG. 1 are executed using a CPU, a ROM, or a RAM provided in a network device or the like other than the client PC 100 and the server PC 105.

Figure 2:
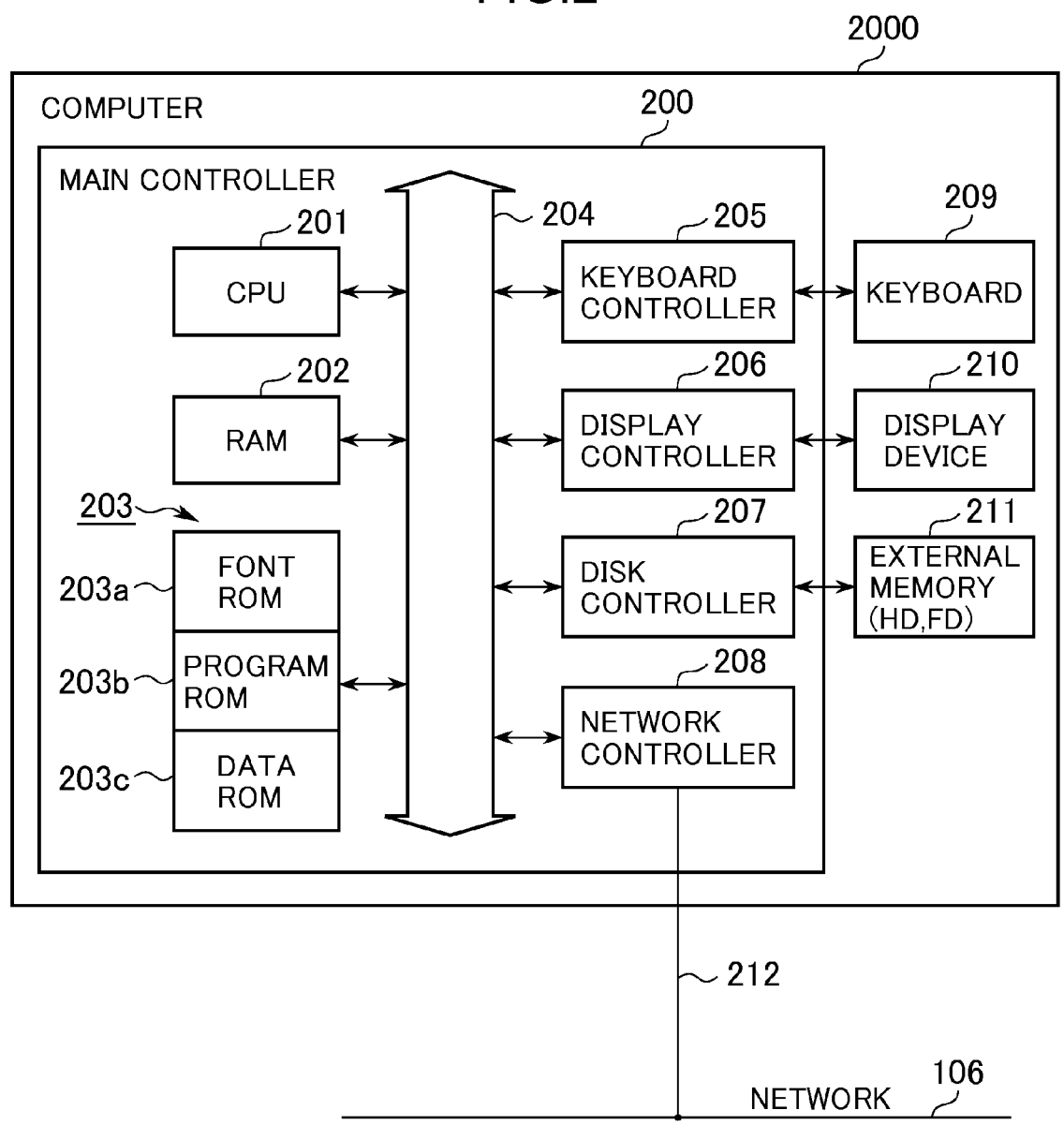
FIG. 2 is a block diagram showing the hardware configuration of a client PC or a server PC appearing in FIG. 1 (first to third embodiments).

Each of the client PC 100 and the server PC 105 is implemented by a computer 2000 having hardware configured as shown in FIG. 2.

The computer 2000 is comprised of a main controller 200 and a keyboard 209, a display device 210, and an external memory 211 as peripheral equipment. The main controller 200 is comprised of a CPU 201, a RAM 262, a ROM 203, a keyboard controller 205, a display controller 206, a disk controller 207, and a network controller 208.

The CPU 201 performs centralized control of the devices connected to a system bus 204. The CPU 201 executes various processes including document processing and service providing processing based on applications (a document processing program, a service providing program, and so forth) stored in a program ROM 203b in the ROM 203 or the external memory (HD) 211.

The document processing program is provided for document processing for processing a document containing graphics, images, text, and tables (including spreadsheets) in a mixed manner. Further, the external memory 211 may store not only applications for document processing, but also applications for acquiring and processing various kinds of information, such as image information on still images or moving images, and video information including music information, sound information, etc.

The CPU 201 carries out processing for rasterizing an outline font e.g. into a display RAM secured in the RAM 202, to thereby display character strings on the display device 210 via the display controller 206. Further, based on a command designated by a mouse cursor (not shown) or the like on the display device 210, the CPU 201 opens an associated one of various windows and executes an associated one of various data processes or service providing processes. In the case of using the client application 101 or 10la or the server application 108, a user can open a configuration window for the application to configure various settings on the window. The display device 210 can be implemented by any of a CRT display device, a liquid crystal display device, a plasma display device, and the like.

The RAM 202 is used as a main memory, a work area, etc. of the CPU 201. The ROM 203 is comprised of a font ROM 203a, the program ROM 203b, and a data ROM 203c.

The font ROM 203a and the external memory 211 store font data and the like for use in document processing and service providing processing. The program ROM 203b and the external memory 211 store an operating system as a control program of the CPU 201, and like other programs. The data ROM 203c and the external memory 211 store various kinds of data (including programs) for use in document processing and service providing processing. The programs stored in the external memory 211 are each loaded in the RAM 202 when it is executed.

The keyboard controller 205 controls input data and commands from the keyboard 209 and a pointing device (not shown). The display controller 206 controls the display operation of the display device 210. The disk controller 207 controls access to the external memory 211.

The network controller 208 is connected to the network 106 via a bidirectional interface 212. The network controller 208 performs connection or disconnection of the network and a session by the client inter-process communication section 103 or 107 and the communication library 104a or 104b each appearing in FIG. 1.

The keyboard 209 is provided with keys for entering various kinds of data and commands. The display device 210 displays various kinds of information involved in document processing, service providing processing, etc. The external memory 211 is implemented by a hard disk. (HD), a flexible disk (FD), etc. The external memory 211 stores a boot program, various applications, font data, user files, edited files, etc. The external memory 211 also stores control programs as applications for executing respective processes described hereinafter with reference to flowcharts and sequence diagrams shown in FIGS. 6 to 9B, FIGS. 10A to 11B, and FIGS. 12A to 13B.

Figure 3:
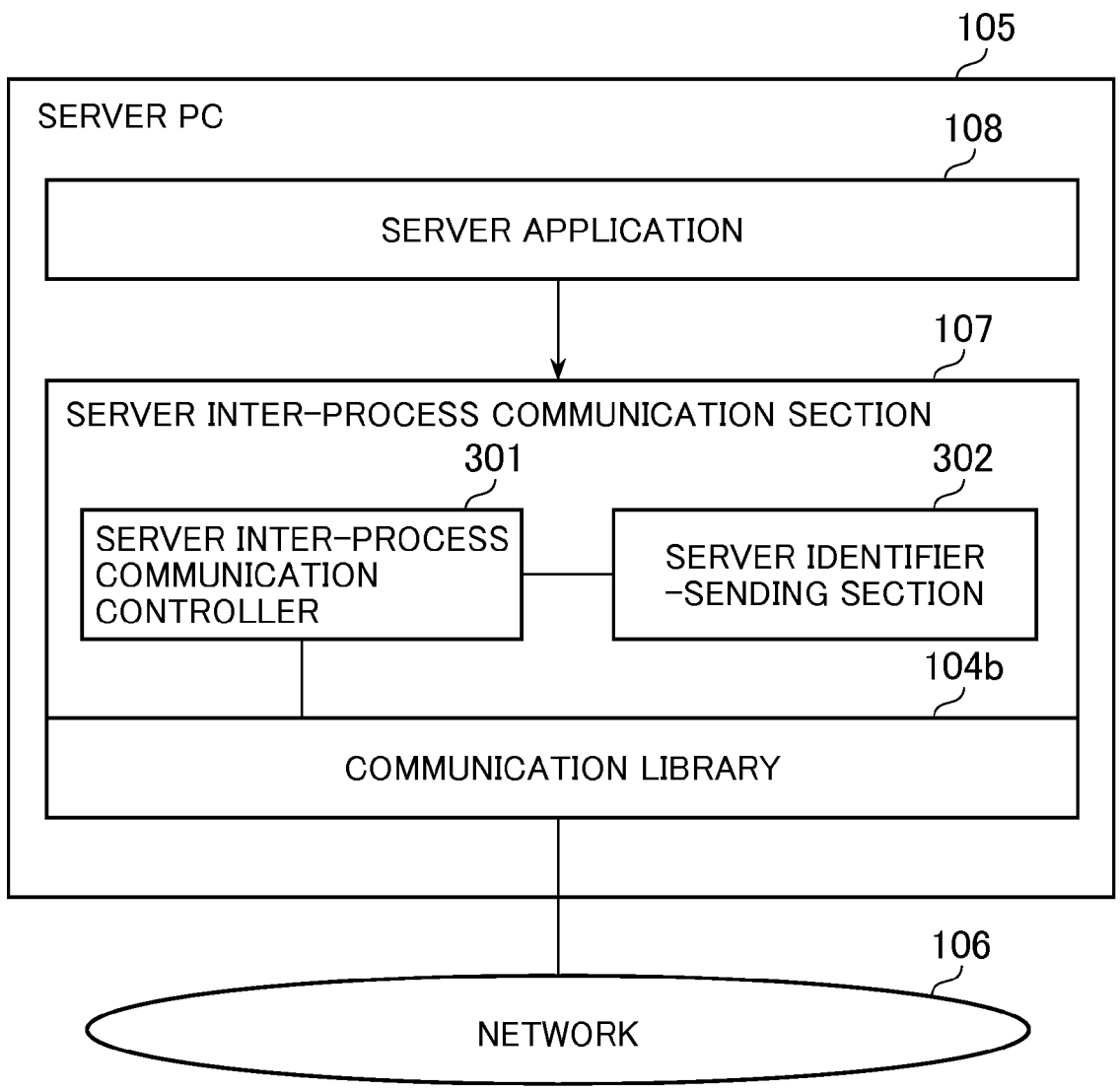
FIG. 3 is a block diagram showing the software configuration of a server inter-process communication section of the server PC (first to third embodiments) in detail.

FIG. 3 is a block diagram showing the software configuration of the server inter-process communication section 107 of the server PC 105 in detail.

The server inter-process communication section 107 is comprised of a server inter-process communication controller 301 and a server identifier-sending section 302, and responds to a communication request from the client PC 100. More specifically, in response to a request from the client PC 100, the server inter-process communication controller 301 causes the server identifier-sending section 302 to send a server identifier 504 (see FIG. 5) or response data generated by the server application 108 back to the client PC 100. The process for sending the server identifier 504 as a response will be described in detail hereinafter.

Figure 4:
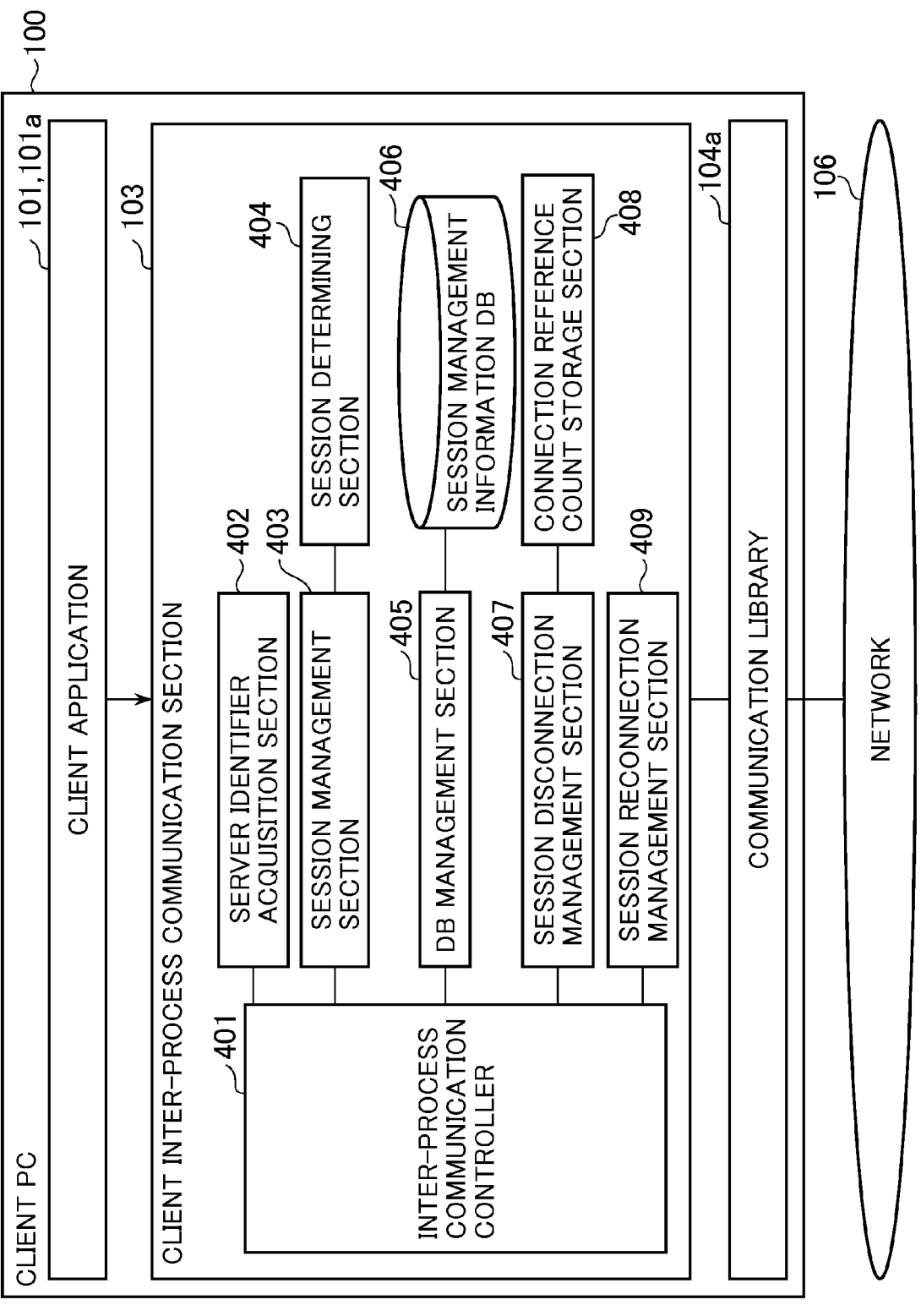
FIG. 4 is a block diagram showing the software configuration of a client inter-process communication section of the client PC (first to third embodiments) in detail.

FIG. 4 is a block diagram showing the software configuration of the client inter-process communication section 103 of the client PC 100 in detail. In FIG. 4, the stub objects 102 and 102a described with reference to FIG. 1 are omitted (the same applies to FIGS. 15 and 24). As shown in FIG. 4, the client inter-process communication section 103 is comprised of an inter-process communication controller 401, a server identifier acquisition section 402, a session management section 403, a DB (database) management section 405, a session disconnection management section 407, and a session reconnection management section 409. The client inter-process communication section 103 further includes a session determining section 404, a session management information DB 406, and a connection reference count storage section 408.

The client inter-process communication section 103 performs session management under the control of the inter-process communication controller 401 to thereby control communicating operations to be performed between the client applications 101 and 101a and the server application 108. The server identifier acquisition section 402 acquires the server identifier 504 returned from the server identifier-sending section 302 of the server PC 105. The server identifier 504 is used to select a session to be used.

The session management section 403 carries out processing for generating session information or determines whether or not to delete part of management information stored in the session management information DB 406. The session determining section 404 determines whether or not existing sessions for destination addresses different from a destination address designated upon requesting connection include one involving the same server that is identified by the server identifier 504 (server identification information). In other words, the session determining section 404 determines whether to perform communication by establishing a new session or by using an existing session.

The DB management section 405 controls access to the session management information DB 406 (see FIG. 5). The session disconnection management section 407 manages session disconnection based on a connection reference count. The connection reference count storage section 408 stores the connection reference count. This connection reference count is used so as to determine timing for closing a session. The session reconnection management section 409 performs control so as to continue a communication currently performed in a session where a communication error has occurred, by reconnection to another address (socket).

FIG. 5 is a diagram of an example of session management information registered in the session management information DB 406. An application identifier 501 is an identifier (instance handle) for identifying the client application 101 or 101*a* having issued a connection request.

Request address information 502 is indicative of a destination address designated by the client application 101 or 101*a* when the client application 101 or 101*a* requests connection thereto. The destination address includes an IP address 502*a* and a port number 502*b*. Communication address information 503 is indicative of the address of a connection destination (server PC 105) of a session selected for actual communication after availability of an existing session having been determined based on the designated destination address. This communication address includes an IP address 503*a* and a port number 503*b*.

The communication address information 503 may include, in addition to the IP address 503*a* and the port number 503*b*, an endpoint as alternative information for the port number 503*b* or channel information as alternative information for the IP address 503*a* and the port number 503*b*.

The server identifier 504 (instance handle) is acquired by the client application 101 or 101*a* on a connection requesting side by requesting the server PC 105 based on a destination address (an IP address, a port number, and so forth). A session number 505 is an identification number assigned to each session established based on a series of requests and responses (data transfer) exchanged between the client application 101 or 101*a* on the connection requesting side and the server application 108 as a connection destination, so as to identify one session from another.

Figure 6:
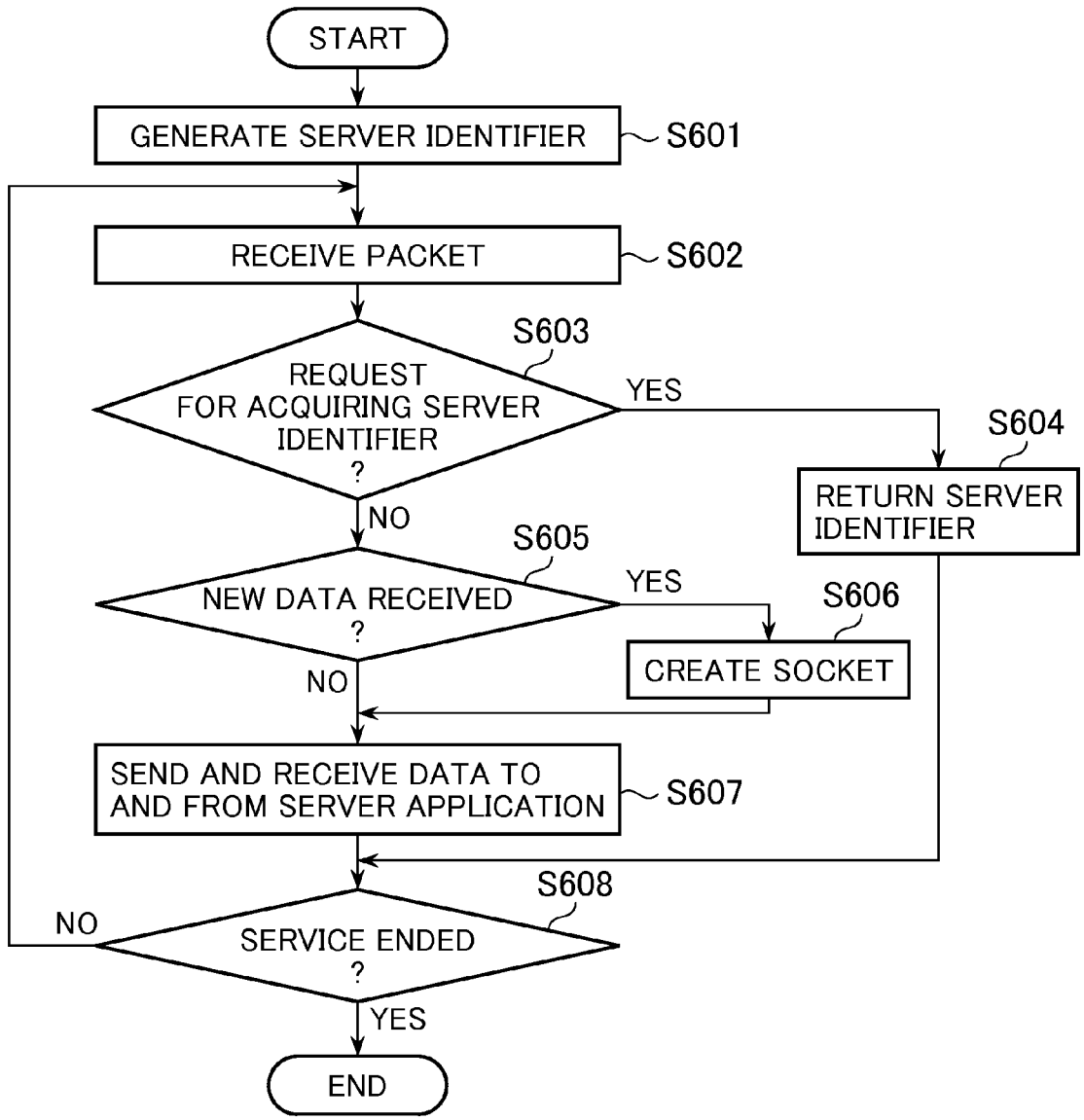
FIG. 6 is a flowchart of a session management process executed by the server inter-process communication section of the server PC in the first embodiment.

Next, the session management process executed by the server inter-process communication section 107 of the server PC 105 will be described with reference to a flowchart in FIG. 6.

Upon reception of a connection request from the client PC 100, the server inter-process communication controller 301 of the server inter-process communication section 107 causes the server identifier-sending section 302 to generate a server identifier 504 (step S601). A UUID (Universally Unique Identifier) or the like enabling unique identification is used as the server identifier 504. From then on, the server inter-process communication section 107 of the server PC 105 returns the same server identifier 504 irrespective of the IP address and port number of a socket having received packets.

Next, the server inter-process communication controller 301 receives a packet from the client PC 100 via the communication library 104*b* (step S602). Then, the server inter-process communication controller 301 determines whether or not the packet received from the client PC 100 is for making a request for acquisition of the server identifier 504 (step S603).

If the packet is for making a request for acquisition of the server identifier 504, the server inter-process communication controller 301 returns the server identifier 504 generated by the server identifier-sending section 302 in the step S601 to the client PC requesting the server identifier 504. This processing is carried out in a step S604. In this case, the server identifier 504 is returned as a response packet to the client PC 100 via the network 106, using the communication library 104*b*.

Then, the server inter-process communication controller 301 determines whether or not a service end instruction has been received (step S608). If the service end instruction has not been received, the process returns to the step S602, and service is continuously provided.

On the other hand, if the received packet is not for making a request for acquisition of the server identifier 504, the server inter-process communication controller 301 determines whether or not the received packet is a request for transmission of new data (step S605).

If the received packet requests transmission of new data, the server inter-process communication controller 301 generates a socket for data transfer to the client PC 100 (step S606). This socket generating processing is carried out using the communication library 104*b* through accept processing based on the TCP protocol as a communication protocol.

After execution of the step S606, the process proceeds to a step S607. On the other hand, if the received packet does not request transmission of new data, the process skips over the socket generating processing in the step S606 to the step S607.

In the step S607, the server inter-process communication controller 301 causes the server application 108 to execute service processing for the packet received in the step S602. More specifically, the server inter-process communication controller 301 transfers the data received from the client PC 100 to the server application 108, and the server application 108 generates response data according to the request from the client PC 100. Further, the server application 108 transfers the generated response data to the server inter-process communication controller 301. The server inter-process communication controller 301 returns the response data to the client PC 100 via the network 106, using the communication library 104*b*. Then, the server inter-process communication controller 301 executes the step S608.

Next, a session management process executed by the client inter-process communication section 103 of the client PC 100 will be described with reference to a flowchart in FIG. 7. The process of the present flowchart is actually or directly executed by the inter-process communication controller 401 (the same applies to FIGS. 10A, 10B, 12A, 12B, 18, 20, 21, 26A and 26B).

The inter-process communication controller 401 of the client inter-process communication section 103 accepts a connection request to be made to the server application 108 of the server PC 105 (step S701). This connection request is made from the client application 101 or 101*a*.

Then, the inter-process communication controller 401 acquires the server identifier 504 returned from the server PC 105 in response to the connection request sent to the destination address, via the server identifier acquisition section 402 (step S702). More specifically, under the control of the inter-process communication controller 401, the server identifier acquisition section 402 uses the communication library 104*a* to send acquisition request information for acquisition of the server identifier 504 to the server PC 105 via the network 106. Further, under the control of the inter-process communication controller 401, the server identifier acquisition section 402 acquires the server identifier 504 sent from the server PC 105.

Then, under the control of the inter-process communication controller 401, the session management section 403 determines whether or not an existing session associated with the same server identifier 504 as that acquired in the step S702 is present (step S703).

In this case, the session management section 403 causes the DB management section 405 to acquire session management information from the session management information DB 406. Then, the session management section 403 determines, based on the session management information, whether or not an existing session associated with the same server identifier 504 as that acquired as a response to the connection request made this time is present among existing sessions currently in communication using other addresses. This determination processing is actually carried out by the session determining section 404.

Referring to an example of the session management information in FIG. 5, in communications indicated by Management Numbers 1 and 2, connection requests are made from the client application 101 or 101a for connection to different addresses. Although the addresses are different, these communications are performed with the same server PC 105. In this case, it is not efficient to create a plurality of sessions for communication with the same server PC 105, and therefore the communications indicated by Management Numbers 1 and 2 are performed using a single session.

More specifically, for example, in the case of starting the communication indicated by Management Number 2 in a state where the communication indicated by Management Number 1 has been started first, the inter-process communication controller 401 does not create a new session. Instead, the inter-process communication controller 401 selects the existing session indicated by Management Number 1 as a data transfer session for the communication indicated by Management Number 2 (step S707). Then, the process proceeds to a step S708, described hereinafter.

When an existing session is selected, it is not required to disconnect the session if the session is based on UDP protocol (non-connection-type protocol) communication, whereas it is required to disconnect the session if the session is based on TCP protocol (connection-type protocol) communication. This applies to a step S707 in each of FIGS. 10A to 12B.

If no existing session associated with the same server identifier 504 as that acquired this time is present, the session management section 403 creates a new socket so as to establish a new session (step S704). In this case, the session management section 403 uses the communication library 104a to create the new socket based on the destination address designated by the client application 101 or 101a.

Next, the session management section 403 causes the DB management section 405 to register information on the new session, including the new socket, in the session management information DB 406 (step S705). Then, the inter-process communication controller 401 selects the new session based on the destination address designated by the client application 101 or 101a, for the present data transfer session (step S706).

Next, the inter-process communication controller 401 transfers the data from the client application 101 or 101a to the server application 108 by the session selected in the step S706 or S707 (step S708).

It should be noted that when a new session is selected as a data transfer session, the destination address designated by the client application 101 or 101a and a communication address for actual communication become identical to each other in the steps S704 to S708. Thus, the communication processing by the new session is the same as performed in the RPC (Remote Procedure Call) as a conventional inter-process communication technique.

On the other hand, when an existing session is selected, the destination address designated by the client application 101 or 101a and a communication address for actual communication differ from each other. However, the server identifier 504 acquired in the step S702 as a response to the connection request made this time is identical to the server identifier 504 in the existing session. Therefore, the client inter-process communication section 103 of the client PC 100 can communicate with the server inter-process communication section 107 of the identical server PC 105.

For this reason, in the present embodiment, in processing in the step S707, an existing session associated with the same server identifier 504 as that acquired as a response to the connection request made this time is selected for the present data communication session. In this case, a socket (session) is not created anew for data communication based on the destination address designated by the client application 101 or 101a.

By thus performing communication by an existing session without creating a socket anew, the client PC 100 and the server PC 105 can achieve reduction of the number of communication sockets, which contributes to network resource saving.

Next, the inter-process communication controller 401 determines whether or not a close request from the client application 101 or 101a or a disconnection request from the communication library 104a has been received (step S709). If neither the close request nor the disconnection request has been received, the process returns to the step S701 to continue execution of the steps S701 to S709.

On the other hand, if either the close request or the disconnection request has been received, the session management section 403 causes the communication library 104a to execute close processing for closing the session or socket using the address associated with the close (disconnection) request (step S710). Then, the session management section 403 causes the DB management section 405 to update session management information in the session management information DB 406 based on a result of the processing in the step S710 (step S711).

Next, examples of the processes shown in FIGS. 6 and 7 will be described with reference to sequence diagrams shown in FIGS. 8A to 9B. FIGS. 8A and 8B shows a processing sequence in the case of no existing session mentioned above.

In a process P801 in FIG. 8A, when the server application 108 starts service, the server inter-process communication section 107 starts a Listen process for receiving packets from the client PC 100. Further, the server inter-process communication section 107 carries out processing for creating a UUID for use as the server identifier 504 in the step S601.

Further, in the process P801, the server inter-process communication section 107 creates a receiving socket so as to perform reception at IPv4 Address [10.0.0.10] and Port Number [1025] in the Listen process. Similarly, the server inter-process communication section 107 also creates a receiving socket for IPv6 Address [2001::10] and Port Number [1025].

In a process P802, the client application 101 or 101a makes a request to the client inter-process communication section 103 for connection to IPv4 Address [10.0.0.10] with Port Number [1025]. In a process P803, the client inter-process communication section 103 receives the connection request and carries out the processing in the step S702 for acquiring the server identifier 504. In a process P804, the server inter-process communication section 107 carries out the processing in the step S604 for returning the server identifier 504.

The negotiation in the processes P803 and P804 is desirably performed using UDP communication which is slightly inferior in reliability to TCP communication but enables high-speed communication. However, TCP communication may be used for the negotiation. This also applies to negotiations in FIGS. 9A, 9B, 11A, 11B, 13A and 13B.

In a process P805, the client inter-process communication section 103 carries out the processing in the step S703, i.e. the processing for determining, based on the session management information, whether or not an existing session associated with the same server identifier 504 is present. In the FIGS. 8A and 8B sequence example, it is determined in the processing that no existing session is present. As a consequence, in a process P806, the processing in the steps S704 to S706 is executed for creating a new session.

In a process P807, the server inter-process communication section 107 carries out TCP-based accept processing to thereby create a socket for the new session. In a process P808, the client inter-process communication section 103 returns the result of the connection processing performed in response to the connection request in the process P802 to the client application 101 or 101a.

In a process P809, the processing in the step S708 is carried out. More specifically, the client inter-process communication section 103 carries out data transmission processing for transmitting data to IPv4 Address [10.0.0.10] with Port Number [1025] designated by the client application 101 or 101a. Following this transmission processing, the client inter-process communication section 103 transfers data to the server PC 105 in processes P810-1 to P810-n, according to the amount of data from the client application 101 or 101a.

In a process P811, the server inter-process communication section 107 receives the data from the client application 101 or 101a and transfers the data to the server application 108. Upon completion of the data transfer, the client inter-process communication section 103 notifies a result of the data transfer to the client application 101 or 101a in a process P812.

The actual data communication in the processes P809 to P810-n is desirably performed using TCP communication which is inferior in communication speed, but superior in reliability to UDP communication. However, UDP communication may be used for the actual data communication. This applies to negotiations in FIGS. 9A, 9B, 11A, 11B, 13A and 13B.

In a process P813, the client application 101 or 101a issues a disconnection (close) request for closing connection to IPv4 Address [10.0.0.10] with Port Number [1025] to the client inter-process communication section 103. In response to the disconnection request, the client inter-process communication section 103 carries out the disconnection processing in the step S710.

In a process P814, the server inter-process communication section 107 receives an instruction for closing connection to IPv4 Address [10.0.0.10] with Port Number [1025] from the client inter-process communication section 103, and carries out session disconnecting processing. In a process P815, the client inter-process communication section 103 carries out the processing in the step S711, and notifies disconnection of the session to the client application 101 or 101a.

Figure 9A:
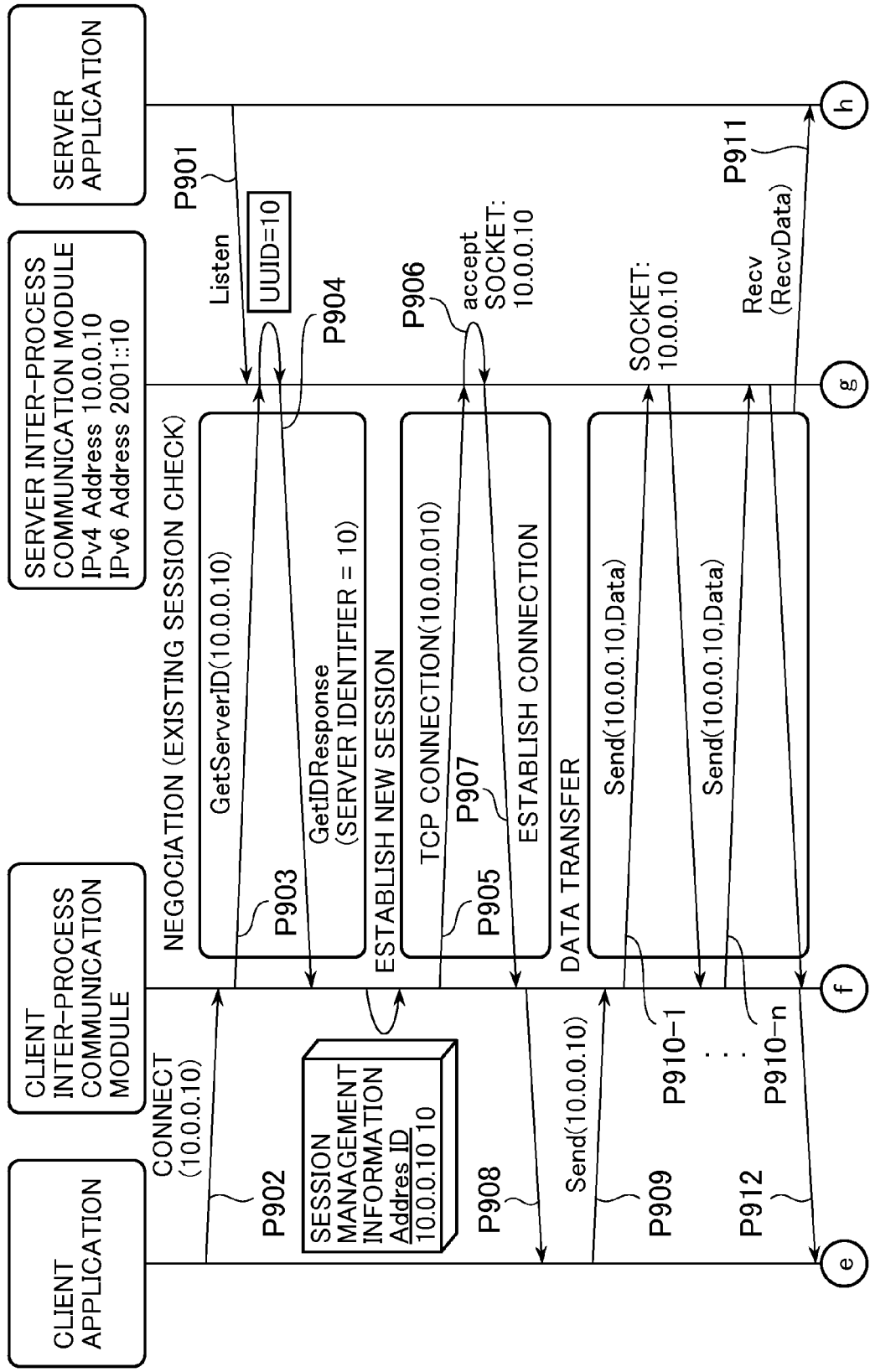

FIGS. 9A and 9B show a processing sequence executed by the session management system according to the first embodiment, in a case where an existing session is present. In a process P901 in FIG. 9A, when the server application 108 starts service, the server inter-process communication section 107 starts a Listen process and creates a server identifier (UUID) 504 in the step S601, so as to receive a packet from a client.

Further, in the process P901, the server inter-process communication section 107 creates a receiving socket so as to carry out reception processing at IPv4 Address [10.0.0.10] with Port Number [1025] in the Listen process. The server inter-process communication section 107 also creates a receiving socket for IPv6 Address [2001::10] with Port Number [1025].

In a process P902, the client application 101 or 101a issues a request for connection to IPv4 Address [10.0.0.10] with Port Number [1025] to the client inter-process communication section 103. In a process P903, the client inter-process communication section 103 receives the connection request and carries out the processing in the step S702 for acquiring the server identifier 504. In a process P904, the server inter-process communication section 107 carries out the processing in the step S604 for returning the server identifier 504 as a response.

In a process P905, the client inter-process communication section 103 carries out the processing in the step S703, i.e. the processing for determining, based on the session management information, whether or not an existing session associated with the same server identifier 504 as that acquired when as a response to the connection request is present. In the FIGS. 9A and 9B sequence example, it is determined in the determination processing in the process P905 that no existing session is present. As a consequence, in a process P906, the processing in the steps S704 to S706 is executed to create a new session.

In a process P907, the server inter-process communication section 107 creates a socket for the new session by executing TCP-based accept processing. In a process P908, the client inter-process communication section 103 returns the result of the connection processing performed in response to the connection request in the process P802 to the client application 101 or 101a.

In a process P909, the processing in the step S708 is carried out. More specifically, the client inter-process communication section 103 carries out data transmission processing for transmitting data to IPv4 Address [10.0.0.10] with Port Number [1025] designated by the client application 101 or 101a. Following this transmission processing, the client inter-process communication section 103 transfers data to the server PC 105 in processes P910-1 to P910-n, according to the amount of data from the client application 101 or 101a.

In a process P911, the server inter-process communication section 107 transfers the data received from the client application 101 or 101a to the server application 108. Upon completion of the data transfer, the client inter-process communication section 103 notifies completion of the data transfer to the client application 101 or 101a in a process P912.

In a process P913, the client application 101 or 101a issues a connection request for connection to IPv6 Address [2001:: 10] with Port Number [1025] to the client inter-process communication section 103. In a process P914, the server inter-process communication section 107 receives the connection request from the client inter-process communication section 103, and carries out the processing in the step S604 for returning the server identifier 504 as a response. In this case, the client application 101 or 101a acquires the server identifier 504 associated with IPv6 Address [2001::10] with Port Number [1025].

In a process P915, the client inter-process communication section 103 carries out the processing in the step S703, i.e. the processing for determining, based on the session management information, whether or not an existing session associated with the same server identifier 504 as that acquired as a response to the connection request is present.

In the FIGS. 9A and 9B sequence example, the same identifier as the server identifier "10" acquired for IPv6 Address [2001::10] with Port Number [1025] is returned from IPv4 Address [10.0.0.10] with Port Number [1025] with which a session has already been established. Therefore, the client inter-process communication section 103 determines that an existing session associated with the same server identifier 504 as that acquired as a response to the connection request is present, and does not establish a session for IPv6 Address [2001::10] with Port Number [1025].

From then on, the client inter-process communication section 103 transfers data which is originally associated with IPv6 Address [2001::10] with Port Number [1025] to IPv4 Address [10.0.0.10] with Port Number [1025].

More specifically, in a process P916, the client application 101 or 101a requests the client inter-process communication section 103 to transfer data to IPv6 Address [2001::10] with Port Number [1025].

In response to this data transfer request, in a process P917, the client inter-process communication section 103 transfers data associated with the request to IPv4 Address [10.0.0.10] with Port Number [1025] which is a different address from IPv6 Address [2001::10] with Port Number [1025] designated by the client application 101 or 101a for data transfer.

In a process P918, the client inter-process communication section 103 repeatedly carries out required transfer processing using the existing session, according to the amount of data from the client application 101 or 101a, until the data transfer is completed.

In a process P919, the server inter-process communication section 107 transfers the data received from the client application 101 or 101a to the server application 108. In a process P920, the client application 101 or 101a instructs the client inter-process communication section 103 to disconnect (close) connection to IPv4 Address [10.0.0.10] with Port Number [1025]. In response to this disconnection instruction, the client inter-process communication section 103 carries out the disconnection processing in the step S710.

In a process P921, the server inter-process communication section 107 receives a disconnection instruction from the client inter-process communication section 103, and carries out disconnection processing for disconnecting the session for IPv4 Address [10.0.0.10] with Port Number [1025].

As described above, according to the first embodiment, an existing session established for an address which is different from a destination address designated by the client application 101 or 101a but is associated with an identical server identifier 504 is used as a session for data communication.

This makes it possible to efficiently use or save network resources, such as sockets. The second and third embodiments described hereinafter can also provide the same advantageous effect.

In the first embodiment, e.g. when the client application 101 disconnects a first session, the client application 101a using the first session as an existing session cannot perform data communication any longer.

However, if the client inter-process communication section 103 is configured to increment or decrement only the reference counter of a session in response to a connection request or a close request from the client application 101 or 101a, and actually disconnect the session when the reference counter becomes equal to 0, it is possible to prevent occurrence of a trouble due to disconnection of the session even when the session is shared by the client applications 101 and 101a.

To this end, the second embodiment is configured such that even when data transmission is performed in an existing session established for an address different from a destination address designated by one of the client applications 101 and 101a, communication by the existing session is prevented from being unintentionally disconnected by a disconnection instruction from the other of the client applications 101 and 101a.

Figure 10A:
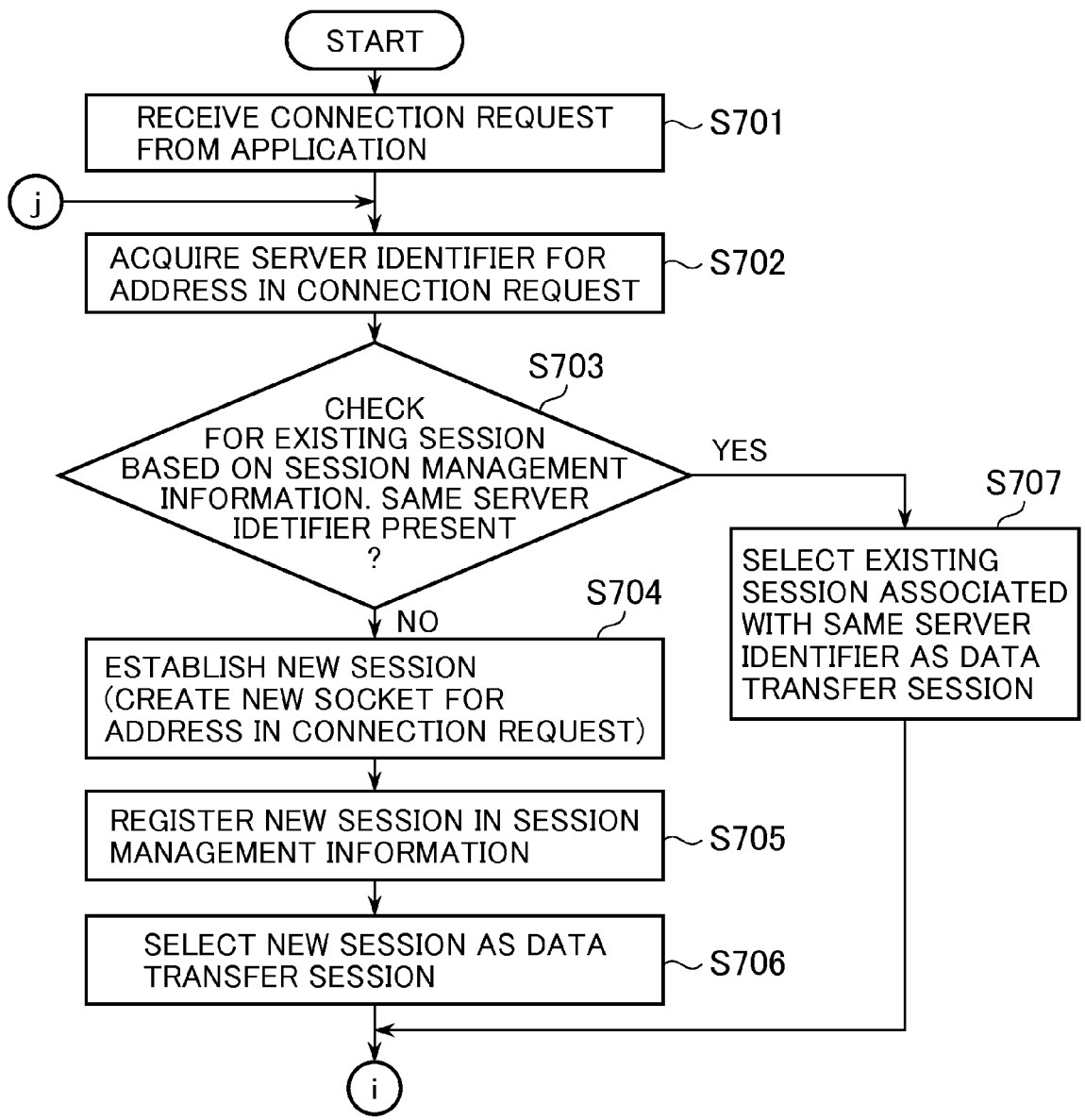
FIGS. 10A and 10B are flowcharts of a session management process executed by the client inter-process communication section of the client PC in the second embodiment of the present invention.
Figure 10B:
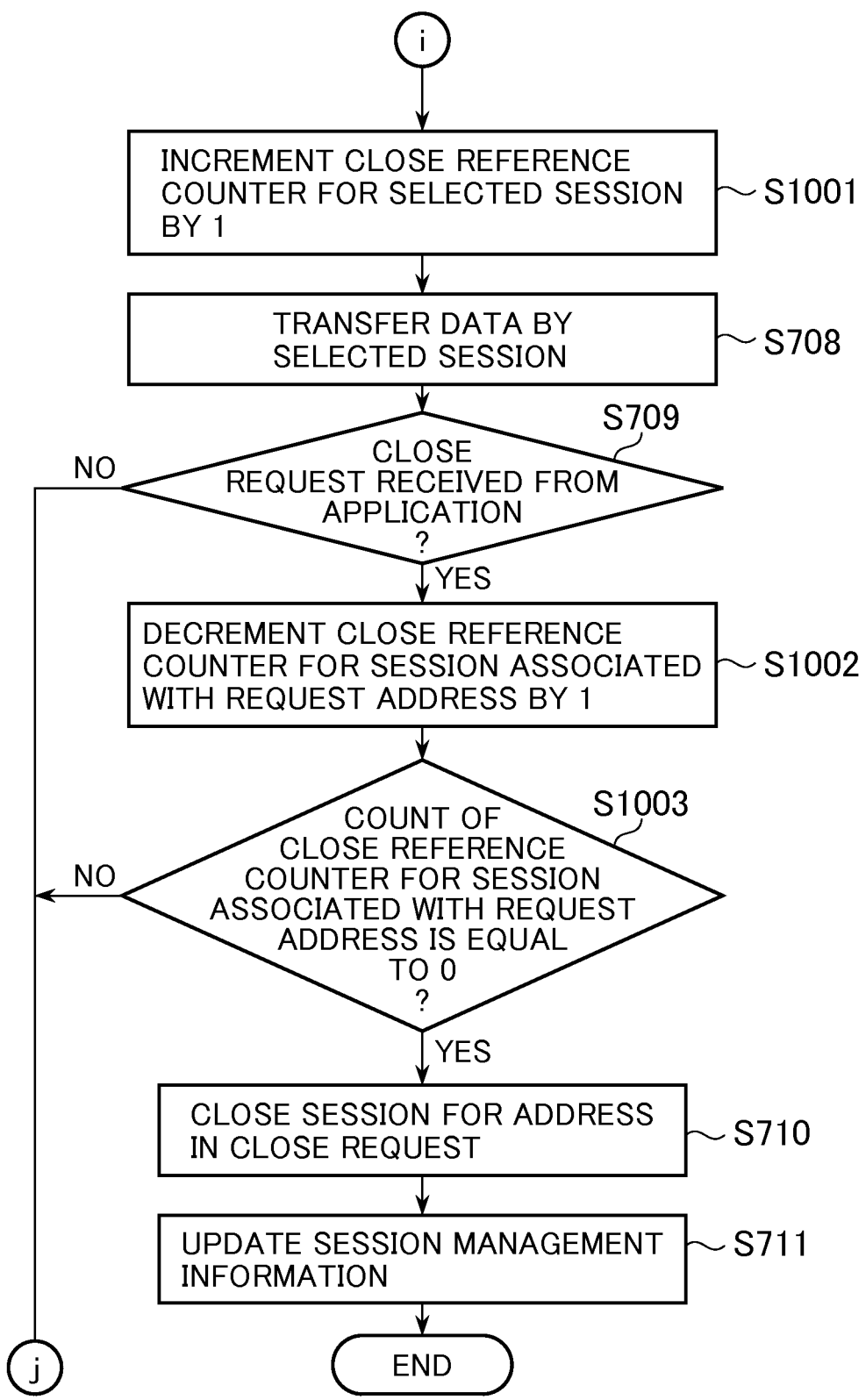

FIGS. 10A and 10B are flowcharts of a session management process executed by the client inter-process communication section 103 of a session management system according to the second embodiment. The configuration of the session management system according to the second embodiment is the same as that of the session management system according to the first embodiment, and therefore description thereof is omitted (the same applies to the third embodiment). Further, processing in steps S701 to S711 in FIG. 10B is the same as that in the steps S701 to S711 in the FIG. 7 flowchart, and hence description thereof will be given only as required.

Referring to FIG. 10B, in a step S1001, the inter-process communication controller 401 increments the count of a close reference counter for a session selected in the step S706 or S707 by 1. The close reference counter corresponds to the reference counter mentioned above or the connection reference counter in FIG. 4, and counts the number of connection requests. The session disconnection management section 407 of the client PC 100 stores the counts of the close reference counters of respective sessions in the connection reference count storage section 408, and determines, based on each of the counts, whether or not to disconnect an associated session.

Next, the inter-process communication controller 401 transfers data from the client applications 101 and 101a to the server application 108 by the session selected in the step S706 or S707 (step S708). When the existing session established for the address different from the destination address is selected in the step S707, the count of the close reference counter for the existing session for data transfer is incremented by 1, without creating a new session.

Then, the inter-process communication controller 401 determines whether or not a close request from the client application 101 or 101a or a disconnection request from the communication library 104a has been received (step S709). If the close request or the disconnection request has not been received, the process returns to the step S701 to continue execution of and the steps S701 to S709.

On the other hand, if the close request or the disconnection request has been received, the inter-process communication controller 401 causes the session management section 403 to request the session disconnection management section 407 to execute close processing for closing the session for the address associated with the close request or the disconnection request (step S1002). In this case, the session disconnection management section 407 decrements the count of the close reference counter for the session in the connection reference count storage section 408 by 1 (step S1002).

Next, the inter-process communication controller 401 determines whether or not the count of the close reference counter has become equal to 0 after having been decremented by 1 (step S1003). If the count has not become equal to 0, the process returns to the step S701.

On the other hand, if the count of the close reference counter has become equal to 0, the inter-process communication controller 401 causes the session management section 403 and the communication library 104a to carry out close processing for closing the session or the socket associated with the close (disconnection) request (step S710). Then, the session management section 403 causes the DB management section 405 to update session management information in the session management information DB 406 based on the result of the processing in the step S710 (step S711).

Figure 11A:
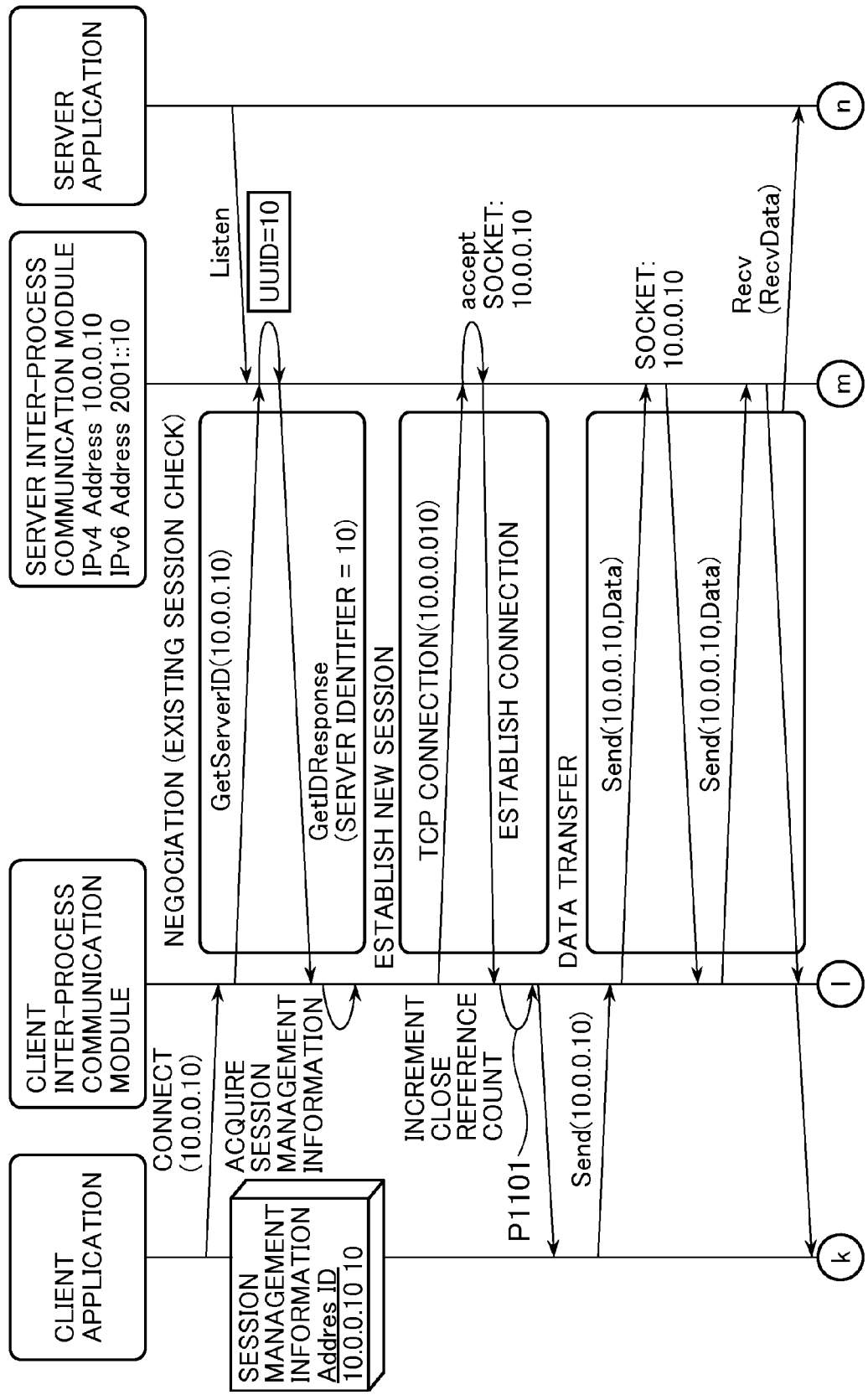

Next, an example of the session management process in FIGS. 10A and 10B will be described with reference to a sequence diagram shown in FIGS. 11A and 11B. It should be noted that the FIGS. 11A and 11B sequence shows a case where data transmission is performed by an existing session established for an address different from a destination address. In the sequence described below, disconnection of the existing session is performed in such an appropriate manner as will prevent communication by the existing session from being disabled unintentionally.

In a process P1101, since the new session is established in the step S706, the client inter-process communication section 103 carries out the processing in the step S1001 for incrementing the count of the close reference counter by 1. This close reference counter functions as a counter for counting the number of connection requests and disconnection requests for each destination address to which a connection request has been made.

In a process P1102, the existing session established for the address different from the destination address in the step S707 is made use of. Therefore, the client inter-process communication section 103 does not create a new session, but carries out the processing in the step S1001 for incrementing the count of the close reference counter by 1.

At this time, the count of the close reference counter stored in the connection reference count storage section 408 for the server PC 105 assigned the server identifier 504 "10" is equal to '2'. The actual communication address is set to IPv4 Address [10.0.0.10] with Port Number [1025].

Besides IPv4 Address [10.0.0.10] with Port Number [1025], IPv6 Address [2001::10] with Port Number [1025] exists as a destination address, and these addresses are each in a connected state.

In a process P1103, the client inter-process communication section 103 carries out close processing for IPv4 Address [10.0.0.10] with Port Number [1025]. At this time, the processing in the step S1002 is executed, whereby the count of the close reference counter stored in the connection reference count storage section 408 in association with the session is decremented by 1.

When this close processing is executed, the count of the close reference counter stored in the connection reference count storage section 408 for the server PC 105 assigned the server identifier "10" becomes equal to 1. Further, the actual communication address remains to be IPv4 Address [10.0.0.10] with Port Number [1025]. Further, IPv6 Address [2001::10] with Port Number [1025] exists as the destination address, and the address is in a connected state.

In a process P1104, the client inter-process communication section 103 carries out close processing for IPv6 Address [2001::10] with Port Number [1025]. At this time, the processing in the step S1002 is executed, whereby the count of the close reference counter stored in the connection reference count storage section 408 is decremented by 1.

When this close processing is executed, the count of the close reference counter stored in the connection reference count storage section 408 in association with the server PC 105 assigned the server identifier "10" becomes equal to 0. Since the count of the close reference counter has become equal to 0, the client inter-process communication section 103 carries out the session close processing in the step S710 in a process P1105. In the present example, the client application 101 or 101a gives a disconnection instruction for IPv6 Address [2001::10] with Port Number [1025] to the client inter-process communication section 103.

However, the client inter-process communication section 103 having received the disconnection instruction from the client application 101 or 101a carries out disconnection processing for IPv4 Address [10.0.0.10] with Port Number [1025] as the actual communication address. This disconnection processing is executed in the steps S710 and S711.

Next, in a process P1106, the server inter-process communication section 107 carries out the following processing: In response to the disconnection instruction for IPv4 Address [10.0.0.10] with Port Number [1025] from the client inter-process communication section 103, the server inter-process communication section 107 carries out disconnection processing for disconnecting the associated session, using the communication library 104b.

This means the following: Let it be assumed that when communication is being performed in an existing session established for an address different from a destination address designated by one application, a disconnection instruction for disconnecting the existing session is issued from another application. In this case, the existing session is not disconnected.

In other words, according to the second embodiment, even in a case where data transmission is performed in an existing session established for an address different from a destination address, communication by the existing session is not unintentionally disconnected by a disconnection instruction from another application.

Assuming, for example, that when the client application 101 disconnects a session which the client application 101a is using as an existing session for data communication, the client application 101a becomes incapable of performing the data communication any longer.

However, by configuring, for example, such that the client inter-process communication section 103 only increments and decrements the count of a reference counter provided for an existing session to the same server in response to each connection request and each close (disconnection) request thereto from the client application 101 or 101a, and the session is actually disconnected only when the reference counter becomes equal to 0, it is possible to prevent occurrence of the above-mentioned problem upon session disconnection even if the session is shared by the client applications 101 and 101a.

According to the first embodiment, even when the client applications 101 and 101a designate different destination addresses, respectively, the same session can be used. In this case, a communication address actually used for communication is set to a first destination address used for creating the session.

However, if a communication trouble occurs in the communication using the first destination address used for creating the session, even when a second destination address is available for communication, one client application originally having designated the second destination address and currently performing communication in the same session as the other cannot perform the communication any longer.

According to the third embodiment, even if a session encounters such a communication trouble, insofar as a destination address available for communication exists, it is made possible to perform communication in the session.

Figure 12B:
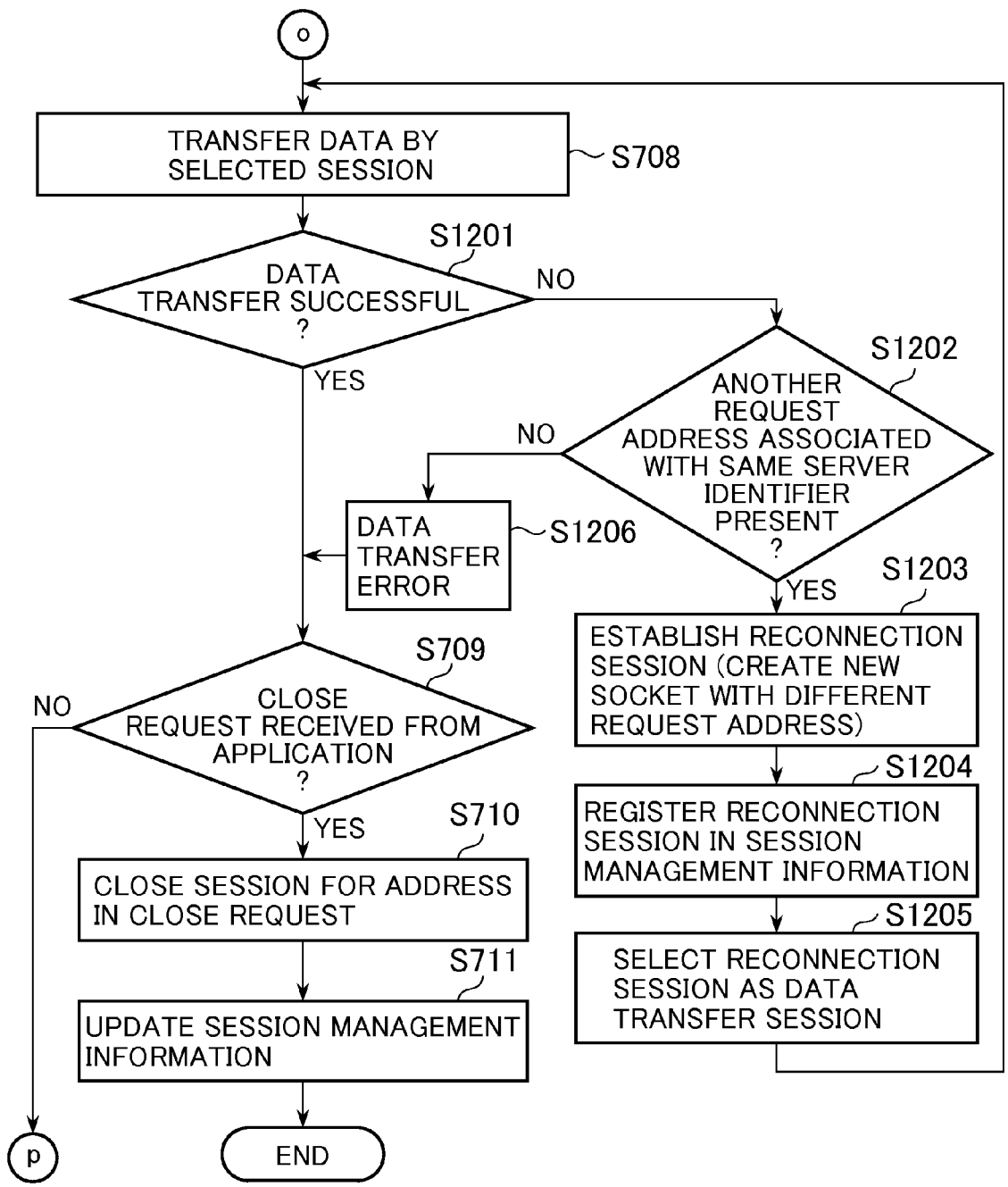

FIGS. 12A and 12B are flowcharts of a session management process executed by the client inter-process communication section 401 of the client PC 100 of a session management system according to the third embodiment of the present invention. It should be noted that steps S701 to S711 in FIGS. 12A and 12B are the same as the steps S701 to S711 in the FIG. 7 flowchart, and therefore not all the steps, but only steps unique to the third embodiment will be described.

Referring to FIG. 12B, the inter-process communication controller 401 transfers data from the client application 101 or 101a to the server application 108 by the session selected in the step S706 or S707 (step S708).

Next, the inter-process communication controller 401 determines whether or not the data transfer is successful (step S1201). If the data transfer is successful, the inter-process communication controller 401 determines whether or not a close request from the client application 101 or 101a or a disconnection request from the communication library 104a has been received (step S709).

On the other hand, if the data transfer is unsuccessful, the inter-process communication controller 401 causes the session management section 403 to determine whether or not another destination address associated with the same server identifier 504 exists (step S1202).

When no other destination address associated with the same server identifier 504 exists, the inter-process communication controller 401 executes data transfer error processing (step S1206), and the process proceeds to the step S709.

On the other hand, when another destination address associated with the same server identifier 504 exists, the inter-process communication controller 401 causes the reconnection management section 409 to establish a reconnection session for the other destination address associated with the same server identifier 504 (S1203). In this case, a new socket is created using an address different from the communication address suffering from communication failure.

Next, the inter-process communication controller 401 registers the reconnection session in the session management information DB 406 via the DB management section 405 (step S1204). Then, the inter-process communication controller 401 selects the reconnection session as a data transfer session (step S1205). Then, the process returns to the step S708, wherein data transfer is performed using the reconnection session.

Figure 13A:
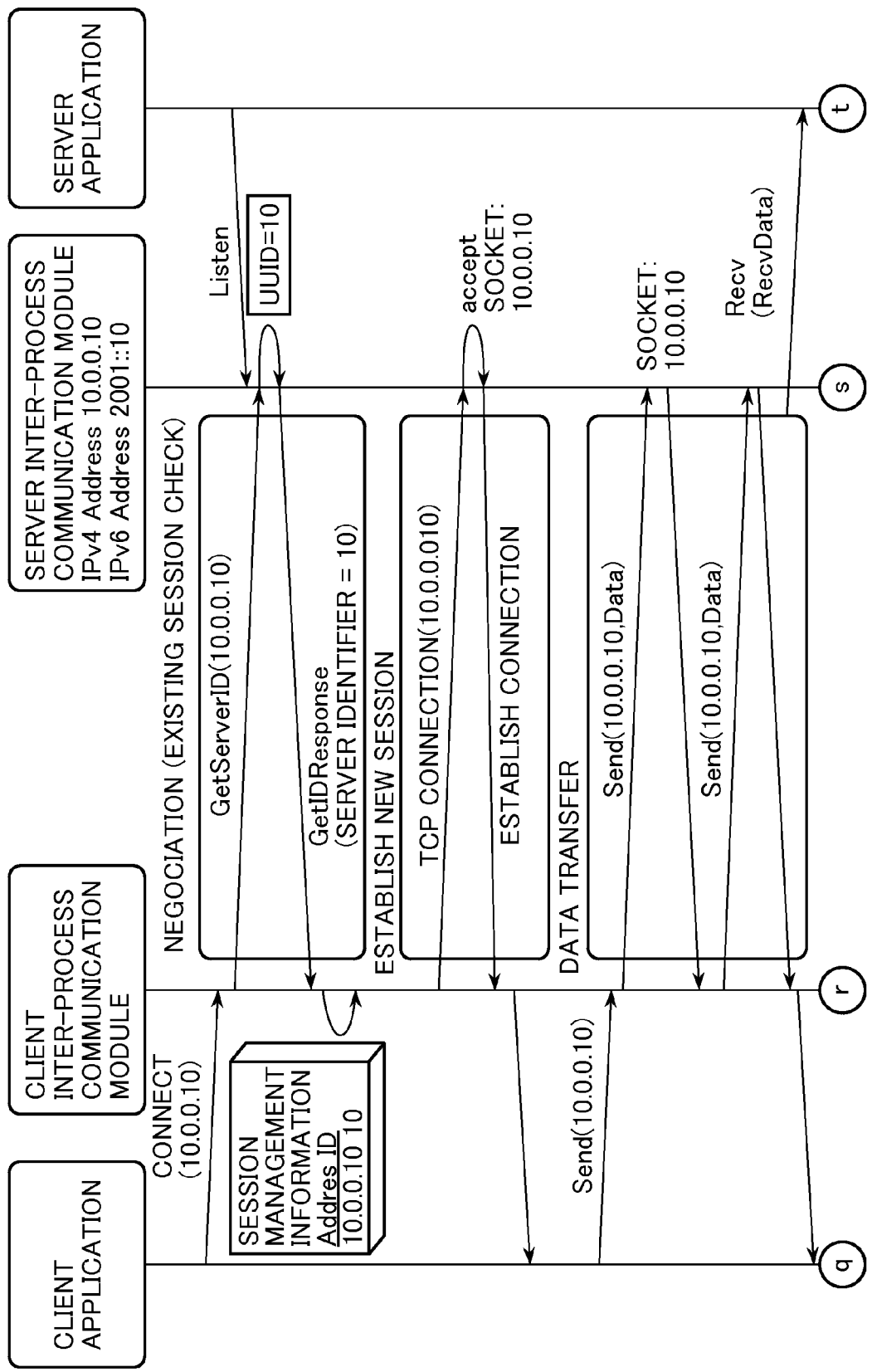
FIGS. 13A and 13B are sequence diagrams of the session management process executed between the server PC and the client PC in the third embodiment.
Figure 13B:
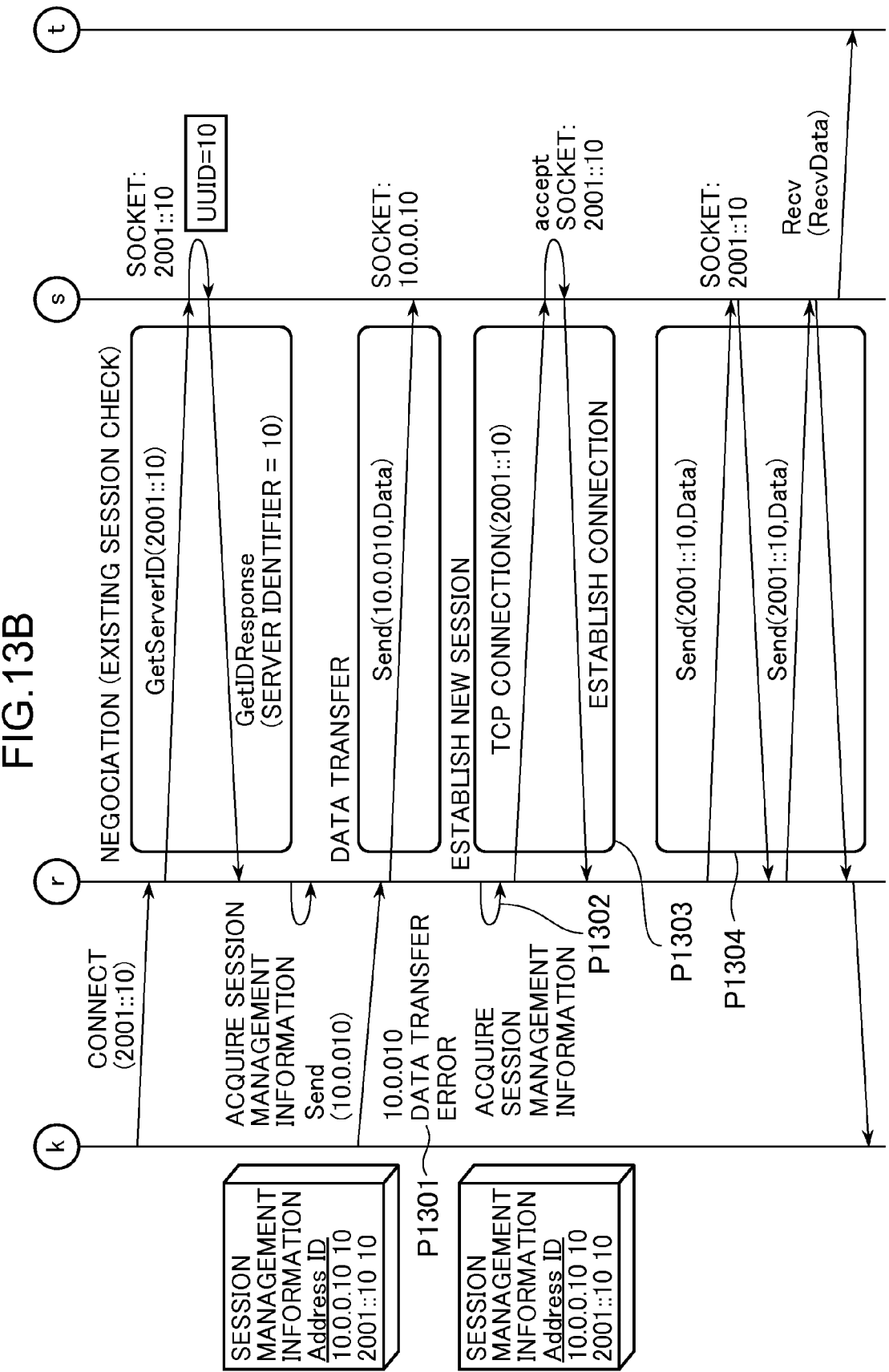

FIGS. 13A and 13B are sequence diagrams of a session management process executed between the server PC 105 and the client PC in the third embodiment. This sequence makes it possible to carry out session reconnection processing in a case where data transmission is performed using an existing session established for an address different from a destination address. Description of the same processing in FIGS. 13A and 13B as in the FIGS. 9A and 9B processing sequence is omitted.

In a process P1301, the inter-process communication controller 401 carries out the processing in the step S1201 for checking whether or not the data transfer is successful. At this time, the count of the close reference counter stored in the connection reference count storage section 408 for the server PC 105 assigned the server identifier 504 "10" becomes equal to2. An actual communication address is set to IPv4 Address [10.0.0.10] with Port Number [1025].

Further, at this time, there are two destination addresses of IPv4 Address [10.0.0.10] with Port Number [1025] and IPv6 Address [2001::10] with Port Number [1025] each in a connected state.

In the present sequence example, the inter-process communication controller 401 determines in the process P1301 that the data transfer performed using IPv4 Address [10.0.0.10] with Port Number [1025] as the actual communication address is unsuccessful.

In a process P1302, the inter-process communication controller 401 causes the session reconnection management section 409 to carry out the processing in the step S1202 for determining whether or not another destination address associated with the same server identifier 504 exists.

In the present sequence example, the session reconnection management section 409 determines that another destination address associated with the same server identifier 504 exists, and establishes a reconnection session (process P1303). The session reconnection management section 409 causes the DB management section 405 to register the reconnection session in the session management information DB 406.

At this time, the count of the close reference counter stored in the connection reference count storage section 408 for the server PC 105 assigned the server identifier "10" becomes equal to 2.

An actual communication address is set to IPv6 Address [2001::10] with Port Number [1025]. Further, as destination addresses, IPv4 Address [10.0.0.10] with Port Number [1025] and IPv6 Address [2001::10] with Port Number [1025] exist each in a connected state.

In a process P1304, the inter-process communication controller 401 uses IPv6 Address [2001::10] with Port Number [1025] to transmit data designated by the client application 101 or 101a.

Thus, in a case where sessions associated with an identical server identifier include one or more connectable destination addresses, it is possible for the client applications 101 and 101a to continue communication without being aware of any communication trouble.

In the first to third embodiments, the client PC 100 determines, based on a server identifier, i.e. server identification information acquired from the server PC 105, whether or not an existing session is present.

However, in order to do this, it is required to provide the server PC 105 with a function of returning the server identifier (server identification information), i.e. the server identifier-sending section 302 for returning the server identifier under the control of the server inter-process communication controller 301. This not only increases processing load applied to the server PC 105 for communication with a large number of client PCs, but also hinders effective use of network resources.

To solve this problem, according to the fourth embodiment, the client PC 100 is configured to perform determination as to whether or not there is an existing session, not based on the server identifier acquired from the server PC 105. In other words, the client PC 100 is configured to determine whether or not an existing session is present, without cooperation with the server PC 105.

Figure 14:
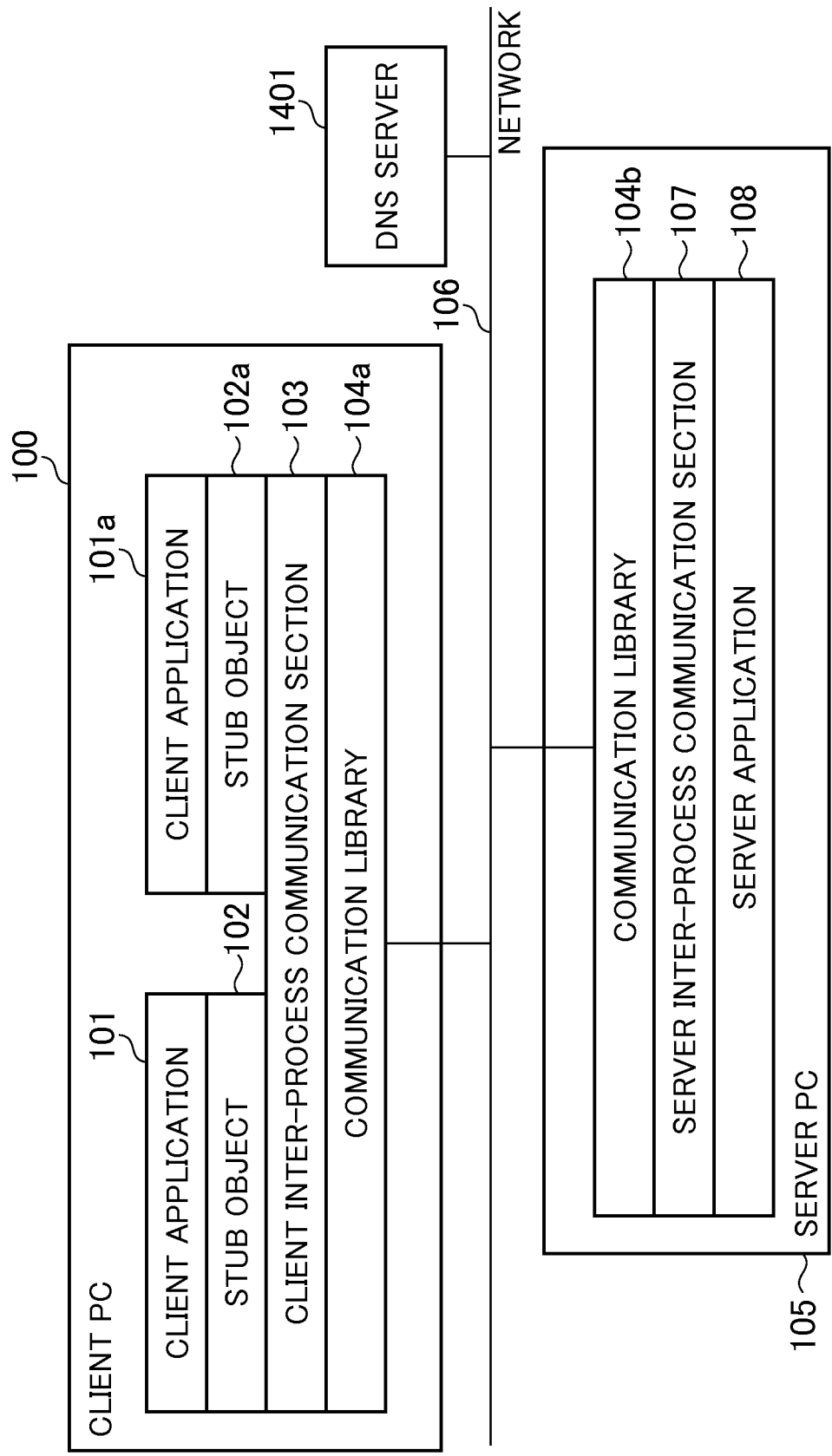
FIG. 14 is a diagram of the software configuration of a client-server system to which is applied a session management system according to the fourth to sixth embodiments of the present invention.

FIG. 14 is a diagram of the software configuration of a client-server system to which is applied each of session management systems according to the fourth to sixth embodiments of the present invention.

The client-server system shown in FIG. 14 is different from the FIG. 1 client-server system to which is applied each of the session management systems according to the first to third embodiment in that a DSN (Domain Name System) server 1401 is connected to the network 106.

In the fourth embodiment, by using the DSN server 1401 or the like, the client PC 100 determines whether or not an existing session is present, without cooperation with the server PC 105. The DNS service operating on the DSN server 1401 is based on an IETF (Internet Engineering Task Force) technical specification. Specifically, the DSN server 1401 provides address problem-solving service according to a specification defined e.g. in RFC (Request for Comments) 1034, RFC 1035, or the like.

RFC 1034, RFC 1035 or the like describes the specification of an A record and implementation of a response compliant with IPv4. Further, RFC 1886 or the like describes the specification of an AAAA record and implementation of a response compliant with IPv6. These RFCs can be referred to at http://www.ietf.org/rfc.html.

Figure 15:
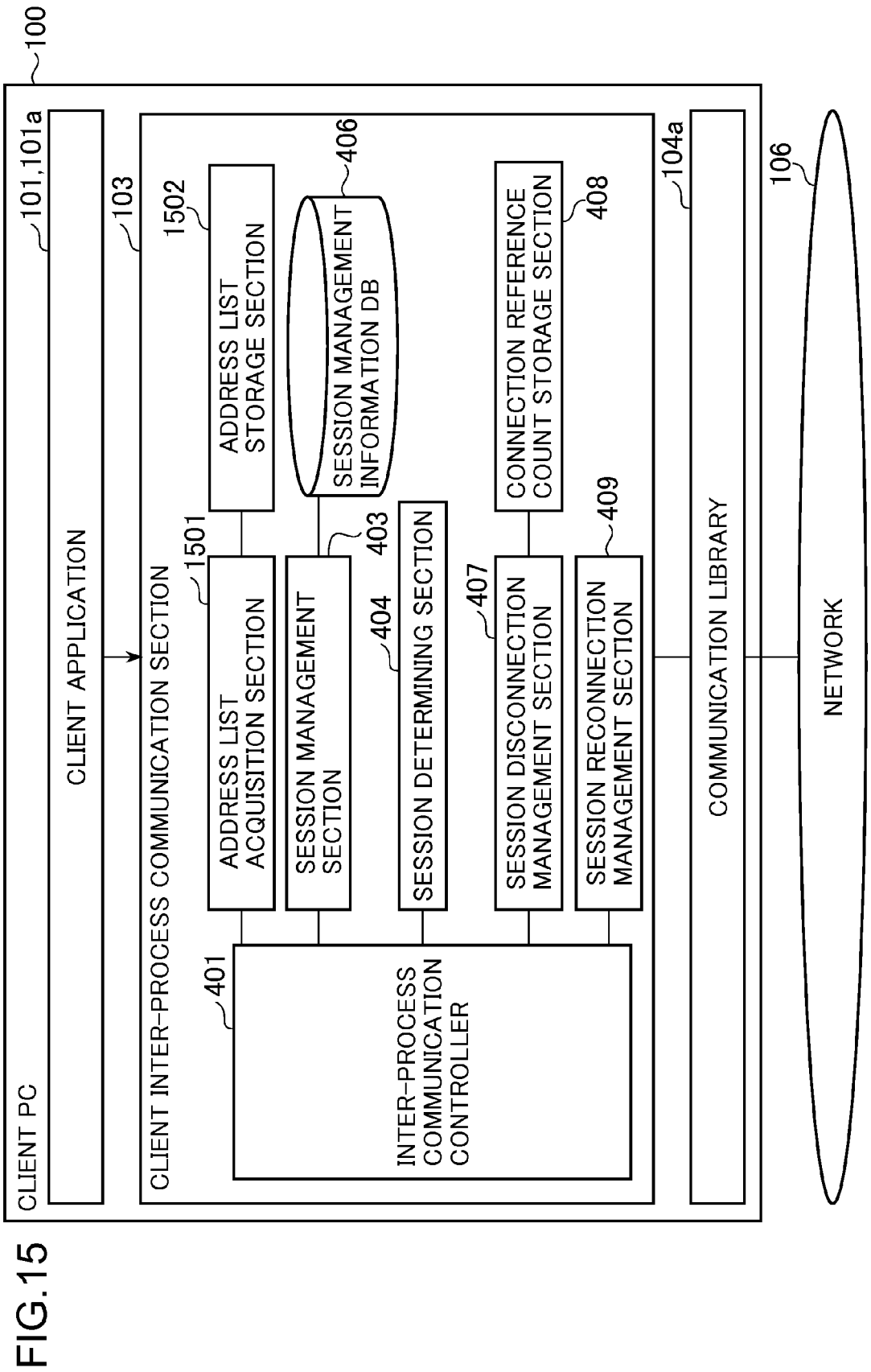
FIG. 15 is a block diagram showing the software configuration of a client inter-process communication section of a client PC according to the fourth embodiment in detail.

FIG. 15 is a block diagram showing the software configuration of a client inter-process communication section 103 of the client PC 100 of the client-server system to which is applied the session management system according to the fourth embodiment in detail.

In response to a request from the client application 101 or 101a, the client PC 100 communicates with the server PC 105, via a stub object (not shown), using the client inter-process communication section 103 and the communication library 104a.

As in the first to third embodiments, the client inter-process communication section 103 includes the inter-process communication controller 401, the session management section 403, the session management information DB 406, and the session determining section 404.

The client inter-process communication section 103 also includes the session disconnection management section 407 and the session reconnection management section 409 similarly to the first to third embodiments. Further, the client inter-process communication section 103 is provided with an address list acquisition section 1501 and an address list storage section 1502 as software specific to the fourth embodiment.

The inter-process communication controller 401 performs centralized overall control of communication performed between the client applications 101 and 101a and the server application 108, while managing sessions. The address list acquisition section 1501 acquires one or more addresses associated with destination addresses designated by the client applications 101 and 101a from the DNS server 1401 and sequentially stores the acquired addresses in the address list storage section 1502. Address list information stored in the address list storage section 1502 will be described in detail hereinafter with reference to FIGS. 16 and 23.

The session management section 403 manages session management information to be registered in the session management information DE 406. The session management information in the fourth embodiment will be described in detail hereinafter with reference to FIG. 17. The session determining section 404 performs determination as to creation of a new session or availability of an existing session, based on an address list and session management information.

Each of the session disconnection management section 407, the connection reference count storage section 408, and the session reconnection management section 409 carries out the same processing as in the first to third embodiments.

Next, the address list information stored in the address list storage section 1502 will be described in detail with reference to FIG. 16. Pieces of address list information concerning destinations (servers) acquired from the DNS server 1401 are sequentially stored in the address list storage section 1502 and are formed into a database.

A server identifier 1601 is server identification information for identifying a server (server PC 105) associated with a destination (connection destination) designated by the client application 101 or 101a on a connection requesting side. The server identifier 1601 may be a host name, a NetBIOS name, a computer name, or a fully qualified domain Name (FQDN), for example.

In the fourth embodiment, however, when the client applications 101 and 101a request connection using a different form of server identification information, the address list acquisition section 1501 converts the different form of server identification information into a host name, as mentioned hereinafter. The address list acquisition section 1501 acquires an address list of host names from the DNS server 1401.

Therefore, each server identifier 1601 in the FIG. 16 address list information is represented by a host name in actuality. For the same reason, each server identifier 504 in the FIG. 17 session management information is also represented by a host name in actuality. However, each server identifier 1601 in the FIG. 23 address list information is illustrated as a server identifier (server identification information) actually designated by the client application 101 or 101a, for convenience of description, though it is actually in the form of a host name.

An address acquisition method 1602 is information indicative of a protocol used for acquiring an associated destination (server) address from the DNS server 1401 and a method of acquiring the same. An address type 1603 is information indicative of the type of an address actually acquired from the DNS server 1401. An IP address 1604 is information indicative of an address (IP address) itself actually acquired from the DNS server 1401.

In the FIG. 16 example, as for a server having a server identifier 1601 represented by "AppServer: host name", IPv4 Address [10.0.0.10] is acquired for communications indicated by List Numbers 1 and 4. Further, as for the server having the server identifier 1601 represented by "AppServer: host name", IPv6 Address [2001::10] is acquired for a communication indicated by List Number 2, and IPv6 Address [fe80::10] is acquired for a communication indicated by List Number 3.

Furthermore, as for a server having a server identifier 1601 represented by "AppServer 2: host name", IPv4 Address [10.0.0. 20] is acquired for a communication indicated by List Number 5, and IPv6 address [2001:: 20] is acquired for a communication indicated by List Number 6.

FIG. 17 is a diagram of an example of the session management information. The application identifier 501 is an identifier (instance handle) for identifying the client application 101 or 101a on the connection requesting side. Request address information 502 indicates a destination address designated as a connection destination by the client application 101 or 101a when it requests a connection thereto. This destination address (request address information 502) includes server identification information (host name, FQDN, etc.), an IP address 502a, such as an IPv4 address or an IPv6 address, and a port number 502b.

Communication address information 503 indicates the address of a connection destination of a session selected for actual communication after having performed determination as to availability of existing sessions based on the destination address. The communication address information 503 includes an IP address 503a and a port number 503b.

A server identifier 504 indicates the server identifier (host name in the present example) of a server as to which the client application 101 or 101a has requested the DNS server 1401 to supply a connection destination address list. A session number 505 indicates the management number (session identification instance handle) of a session for actual communication.

Next, a session management process according to the fourth embodiment, which is executed by the inter-process communication controller 401 of the client inter-process communication section 103, will be described with reference to a flowchart shown in FIG. 18. It should be noted that in FIG. 18, the same steps as those in FIG. 7 are denoted by identical step numbers (the same applies to FIGS. 20, 21, 22A, 22B, 26A, 26B, and 27).

The inter-process communication controller 401 of the client inter-process communication section 103 receives a request for connection to the server application 108 of the server PC 105 (step S701). This connection request is issued from the client application 101 or 101a.

Then, the inter-process communication controller 401 causes the address list acquisition section 1501 to acquire an address list concerning the destination address (step S1801).

In this case, the address list acquisition section 1501 uses the communication library 104*a* to issue an acquisition request to the DNS server 1401 via the network 106 so as to acquire A records, AAAA records, etc. on the address list. The DNS server 1401 returns the associated address list in response to the address list acquisition request from the address list acquisition section 1501.

It should be noted that in the step S1801, the address list acquisition section 1501 carries out the address list acquisition process by making use of various address problem-solving services in addition to the DNS server 1401. Examples of the address problem-solving services include LLMNR (Link Local Multicast Name Resolution) and broadcast search by NetBIOS.

When "Numeric host address" is designated as server identification information in the destination address, the address list acquisition section 1501 converts the "Numeric host address" into a host name and then executes the address list acquisition process.

Figure 19:
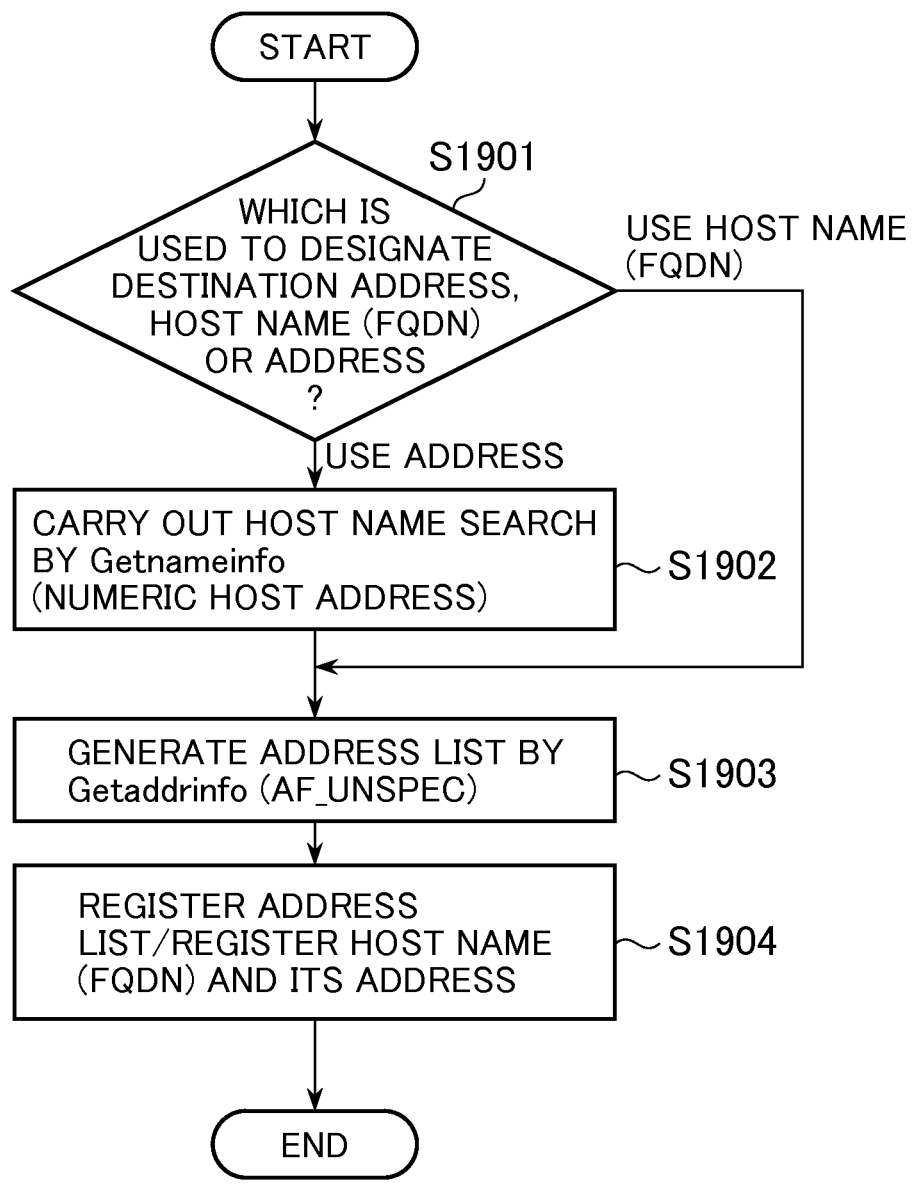
FIG. 19 is a flowchart showing in detail an address list acquisition process executed in a step S1801 in FIG. 18.

The address list acquisition process executed in the step S1801 will be described in detail with reference to a flowchart shown in FIG. 19.

The address list acquisition section 1501 determines which of host name-type server identification information and address-type server identification information is used to designate a server in the destination information from the client application 101 or 101*a* (step S1901). The "address" here refers to "Numeric host address".

When a server is designated using address-type server identification information, the address list acquisition section 1501 searches the DNS server 1401 for a host name associated with the address (step S1902). In this case, e.g. in C/C++ socket programming, the address list acquisition section 1501 searches for a host name associated with the designated address by the getnameinfo( ) function.

Then, the address list acquisition section 1501 designates the host name found based on the address acquisition function, to thereby acquire an address list of a server associated with the host name from the DNS server 1401 (step S1903). In this case, e.g. in C/C++ socket programming, the address list acquisition section 1501 sets ai_family of a getaddrinfo( ) function to a value AF_UNSPEC and calls the function to thereby acquire the address list associated with the host name.

On the other hand, when a server is designated using host name-type server identification information, the step S1902 is skipped over to the step S1903. After completion of the step S1903, the address list acquisition section 1501 registers the host name and the address list associated with the host name in the address list storage section 1502 (step S1904), and the process returns to the main process in FIG. 18.

Then, under the control of the inter-process communication controller 401, the session determining section 404 performs determination as to availability of an existing session based on the address list acquired in the step S1801 and information in the session management information DB 406 (step S1802).

In this case, the session determining section 404 determines that existing sessions are available which are registered in the session management information DB 406 in association with addresses entered in the acquired address list, as ones associated with a host (server) having the same host name.

More specifically, the session determining section 404 determines whether or not, among existing sessions currently performing communication using addresses different from the address used in acquiring the acquired address list (which may contain only one address), there are any sessions associated with the same server of which the address list is acquired. When there is an existing session with the same server, the session determining section 404 determines that the existing session is available.

In this case, the address list is acquired in a state in which server identification information are uniformly converted into host names as mentioned hereinbefore. Therefore, the session determining section 404 identifies a server based on a host name.

This substantially means that even if pieces of server identification information associated with destination addresses designated by the client applications 101 and 101*a* when they request connections are different from each other, insofar as the pieces of the server identification information are associated with the same server, they are handled as the same identification information.

Thus, even when a server is designated by different pieces of server identification information, it is possible to perform proper determination as to availability of an existing session, thereby enabling more efficient use of network resources. This advantageous effect will be described in detail with reference to FIG. 23.

Then, when the existing session is available, the inter-process communication controller 401 selects the existing session as a session for data transfer to be executed this time (step S1803).

For example, in the example of the session management information shown in FIG. 17, sessions indicated by Management Numbers 1 and 2 are ones for respective different destination addresses designated from a client application (1). However, in the case of Management Number 2, there is an existing session (associated with Management Number 1 and assigned Session Number 1) already established in association with the same server identifier "AppServer". In this case, the inter-process communication controller 401 selects the existing session as a session for data transfer without creating a new session.

In the example of the address list in FIG. 16, since the IP addresses [10.0.0.10] and [2001::10] are associated with the same server identifier "AppServer", it is possible to determine, as mentioned above, that an existing session associated with the same server identifier is present.

In the examples illustrated in FIGS. 16 and 17, as for communication concerning a request for connection to the address [2001::10] associated with List/Management Number 2, data transfer is performed using the existing session for the address [10.0.0.10] associated with Management Number 1 and the same server identifier "AppServer" as that associated with the address [2001::10].

Thus, the use of an existing session enables the client PC 100 and the server PC 105 to eliminate the need for creating a new communication socket for a destination address, which makes it possible to save network resources, such as the communication sockets.

Figure 7:
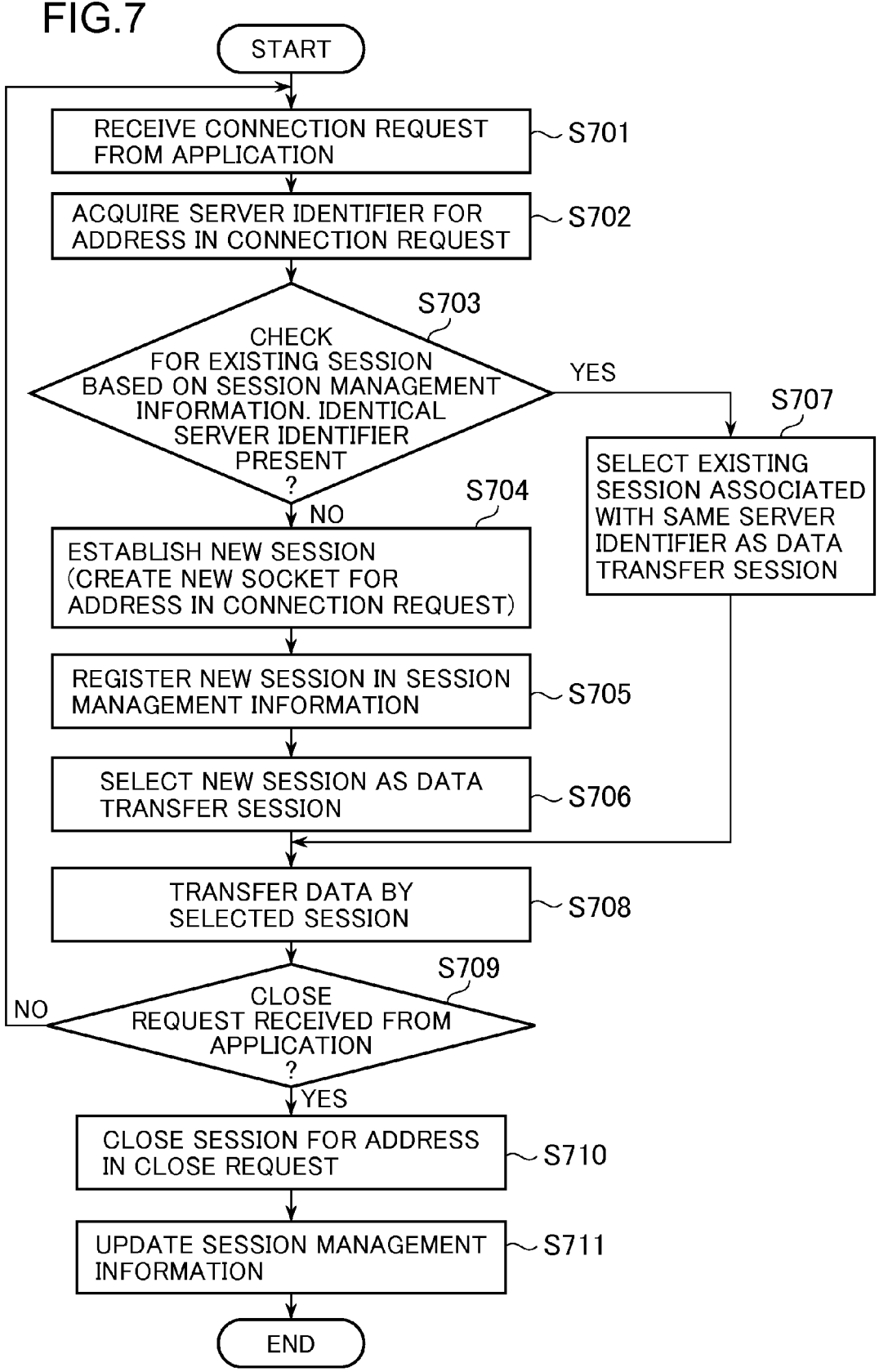
FIG. 7 is a flowchart of a session management process executed by the client inter-process communication section of the client PC in the first embodiment
Figure 18:
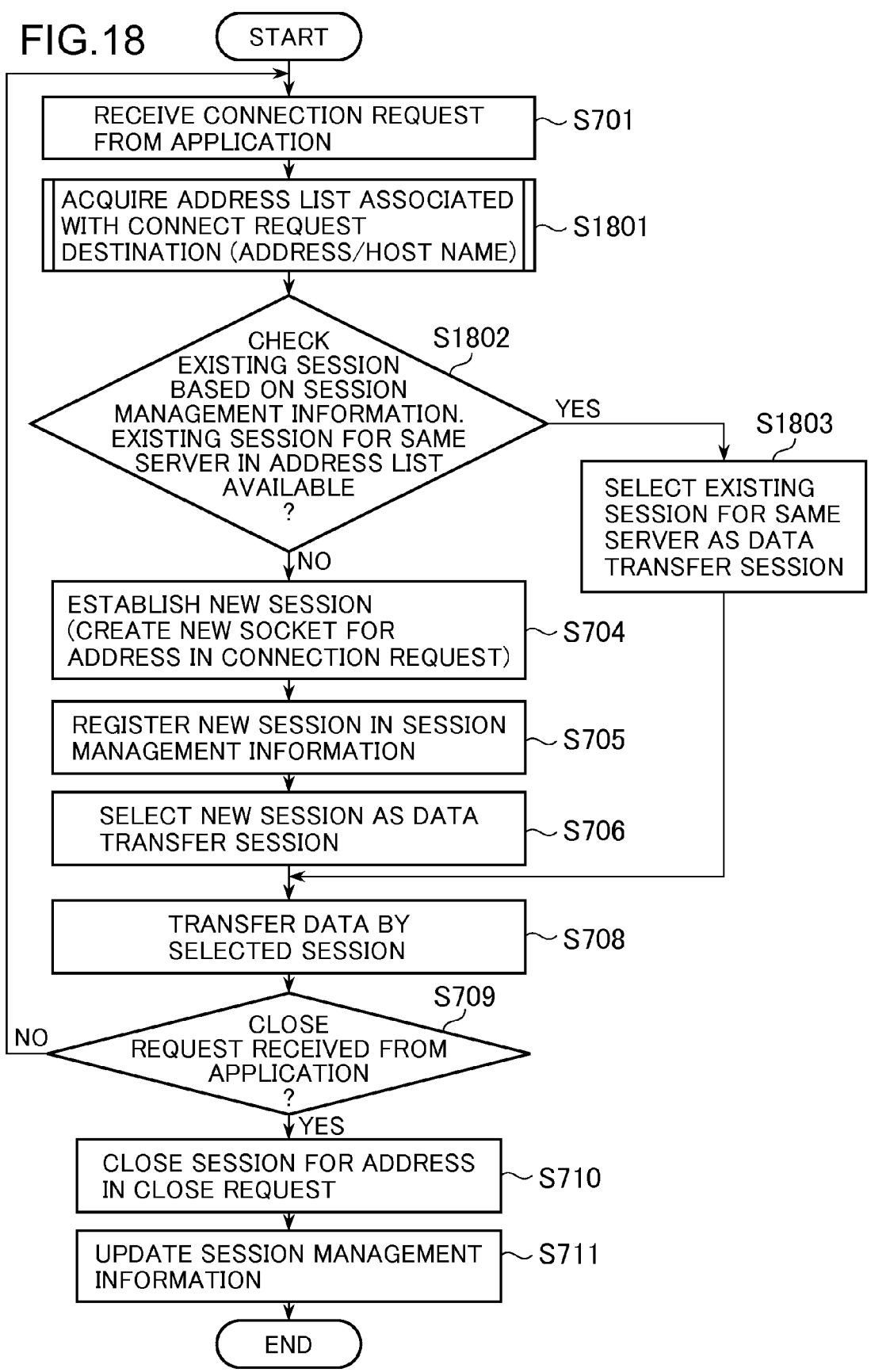
FIG. 18 is a flowchart of a session management process executed in the fourth embodiment.

Steps S704, S705, and S708 to S711 in FIG. 18 are quite the same as the steps denoted by the identical step numbers in FIG. 7, and therefore description thereof is omitted.

Next, a description will be given of a case where first and second client applications designate a server by different pieces of server identification information (host name, FQDN, etc.), respectively.

As described hereinbefore, in the fourth embodiment, even when pieces of server identification information used to designate a destination are different from each other, insofar as the pieces of server identification information are for identifying the same server, they are handled as the same server identification information, whereby it is possible to properly determine availability of an existing session.

FIG. 23 shows an example of address list information acquired in such a case. Information items in the FIG. 23 address list information are quite the same as those in the address list information in FIG. 16, and therefore description thereof is omitted, with the same reference numerals denoting the same information items, respectively. However, server identifiers 1601 in the FIG. 23 address list information are represented not by host names obtained by uniformly converting pieces of server identification information designated in different forms into host names, but by the pieces of server identification information originally used for designation before the conversion, for convenience of description.

In the FIG. 23 example, a server identified by a server identifier "AppServer.foo.test" and a server identified by a server identifier "AppServer" are associated with the same IP address "fe80::10" (see List Numbers 2 and 3).

In such a case, the server identifiers "AppServer.foo.test" and "AppServer" are uniformly converted into the host name, as mentioned above, whereby these servers are handled as the same server. Then, the session determining section 404 determines, based on the address list information containing these two server identifiers which are practically singe, whether or not an existing session is available.

Let it be assumed, for example, that the server identifier "AppServer.foo.test" is designated in destination information when requesting connection thereto, but that there is no existing session for an IP address associated with the server identifier. Let it be also assumed, in this case that a session for the IP address [2001::10] exists as an existing session associated with the server identifier "AppServer" identifying the same server as the server identifier "AppServer.foo.test" does.

In this case, the session determining section 404 determines that the existing session for the IP address [2001::10] associated with the server identifier "AppServer" is available in response to a connection request using the server identifier "AppServer.foo.test".

Thus, server identifiers different from each other, but associated with an identical server are handled as the same server identifier as described above, and therefore even when the server is designated by a different server identifier, it is possible to utilize an existing session to the server, thereby enabling more efficient use of network resources, such as sockets.

In the first to fourth embodiments, even when the client applications 101 and 101a designate respective different destination addresses, the two client applications sometimes use the same session. In this case, the client inter-process communication section 103 performs actual communication using one of the destination addresses for which a session (the same session) is established earlier.

However, when a communication trouble occurs in the communication performed with the destination address designated earlier, even if communication using the other address is possible, the other client application performing communication by the same session also becomes incapable of performing the communication.

To solve this problem, a fifth embodiment is configured such that even if a communication trouble occurs, insofar as another address exists with which connection is possible, a session is established for the other address with which connection is possible, to thereby perform communication.

Figure 20:
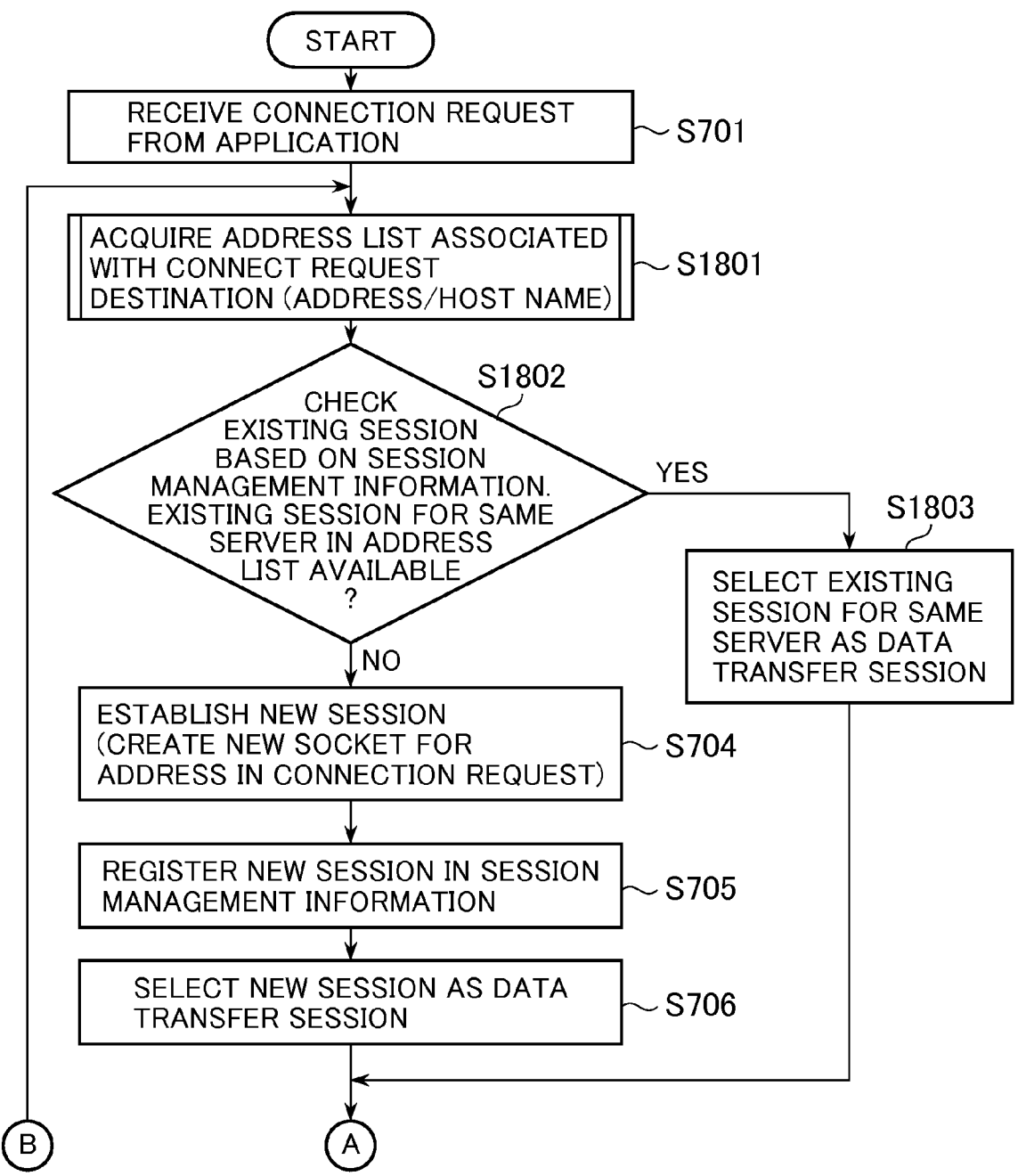
FIG. 20 is a flowchart of a session management process executed in the address list acquisition process in the fifth embodiment.
Figure 21:
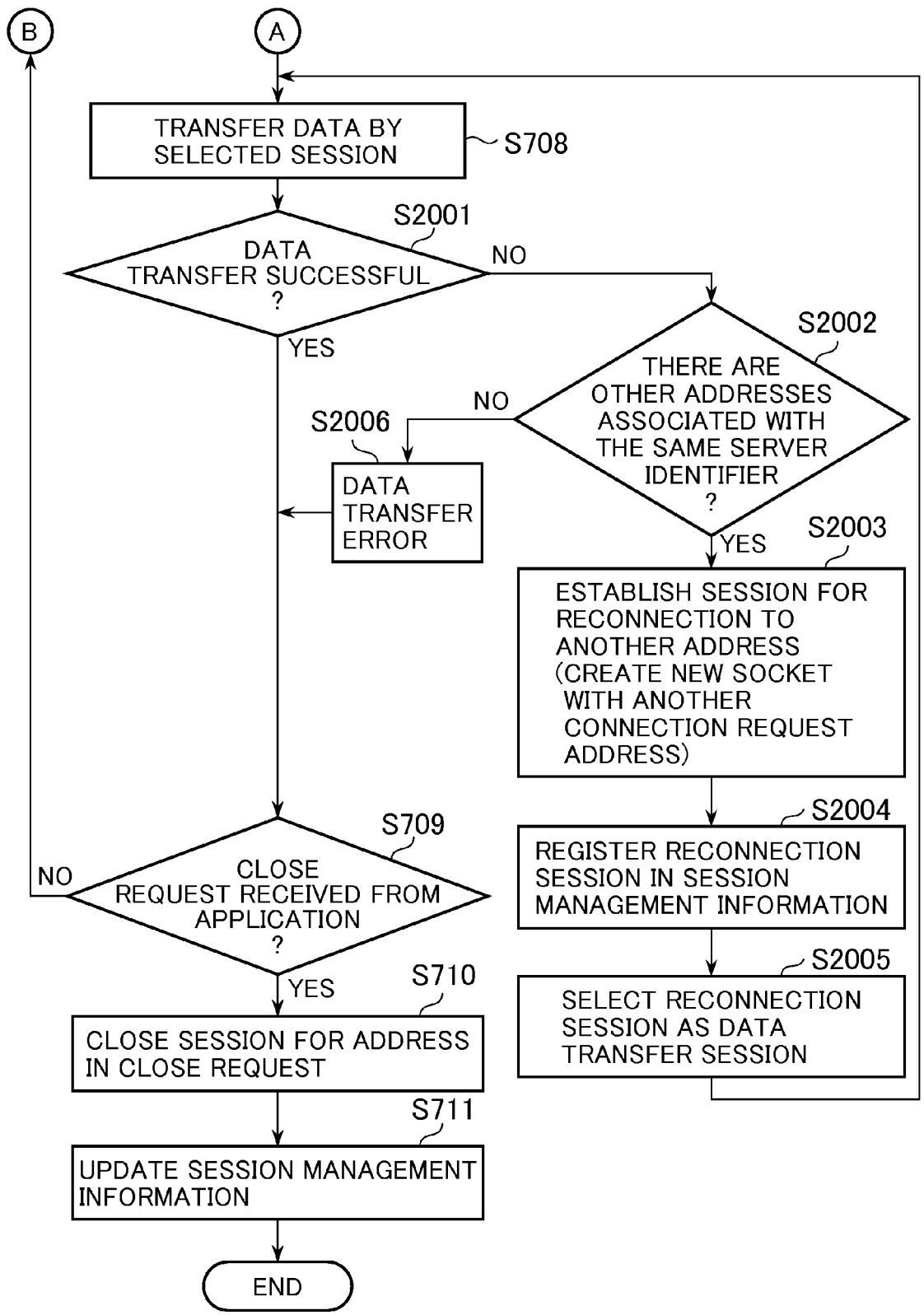
FIG. 21 is a continuation of the flowchart in FIG. 20.

Next, a session management process which is executed by the inter-process communication controller 401 of the client PC 100 of a session management system according to the fifth embodiment will be described with reference to a flowchart shown in FIGS. 20 and 21. The flowchart shown in FIGS. 20 and 21 is partially identical to that in FIG. 18. Therefore, in FIGS. 20 and 21, steps identical to those in FIG. 18 are denoted by identical step numbers, and description thereof is omitted. Hereafter, only different points from the fourth embodiment will be described.

In a step S2001 in FIG. 21 the inter-process communication controller 401 determines whether or not data transfer performed using a session selected in the step S708 is successful. If the data transfer is successful, the steps S709 to S711 are executed.

On the other hand, if the data transfer is unsuccessful, the session determining section 404 determines, under the control of the inter-process communication controller 401, whether or not there exist other addresses associated with the same server identification information (host name, etc.) in the session management information DB 406 (step S2002). If there exist no other addresses associated with the same server identification information, the inter-process communication controller 401 executes data transfer error processing (step S2006), and the process proceeds to the step S709.

On the other hand, if another address associated with the same server identification information exists, the inter-process communication controller 401 establishes a session for reconnection to the other address associated with the same server identification information (host name) (step S2003). In this case, the inter-process communication controller 401 creates a new socket for the address associated with the same server identification information (host name).

If there are a plurality of other addresses associated with the same server identification information (host name), the inter-process communication controller 401 preferentially establishes a session for an address designated by the client application 101 or 101a.

Next, the inter-process communication controller 401 causes the session management section 403 to register information on the session for reconnection in the session management information DB 406 (step S2004). Then, the inter-process communication controller 401 selects the session for reconnection as a session for data transfer (step S2005), and the process returns to the step S708.

As described above, according to the fifth embodiment, even when a trouble occurs during communication using one application while a plurality of applications are performing data transfer by the same session, the other application(s) can continue communication. Therefore, the fifth embodiment makes it possible to construct a communication system resistant to communication trouble and highly reliable in data transfer.

In the fourth and fifth embodiments, e.g. when the application 101 disconnects a first session, the application 101a also using the first session becomes incapable of performing communication.

A sixth embodiment of the present invention provides a solution to this problem in the following manner: The inter-process communication controller 401 does not close each session whenever a close request for the session is received, but closes each session based on a close reference counter provided for the session. In the sixth embodiment, the close reference counters are stored in the connection reference count storage section 408.

Figure 22A:
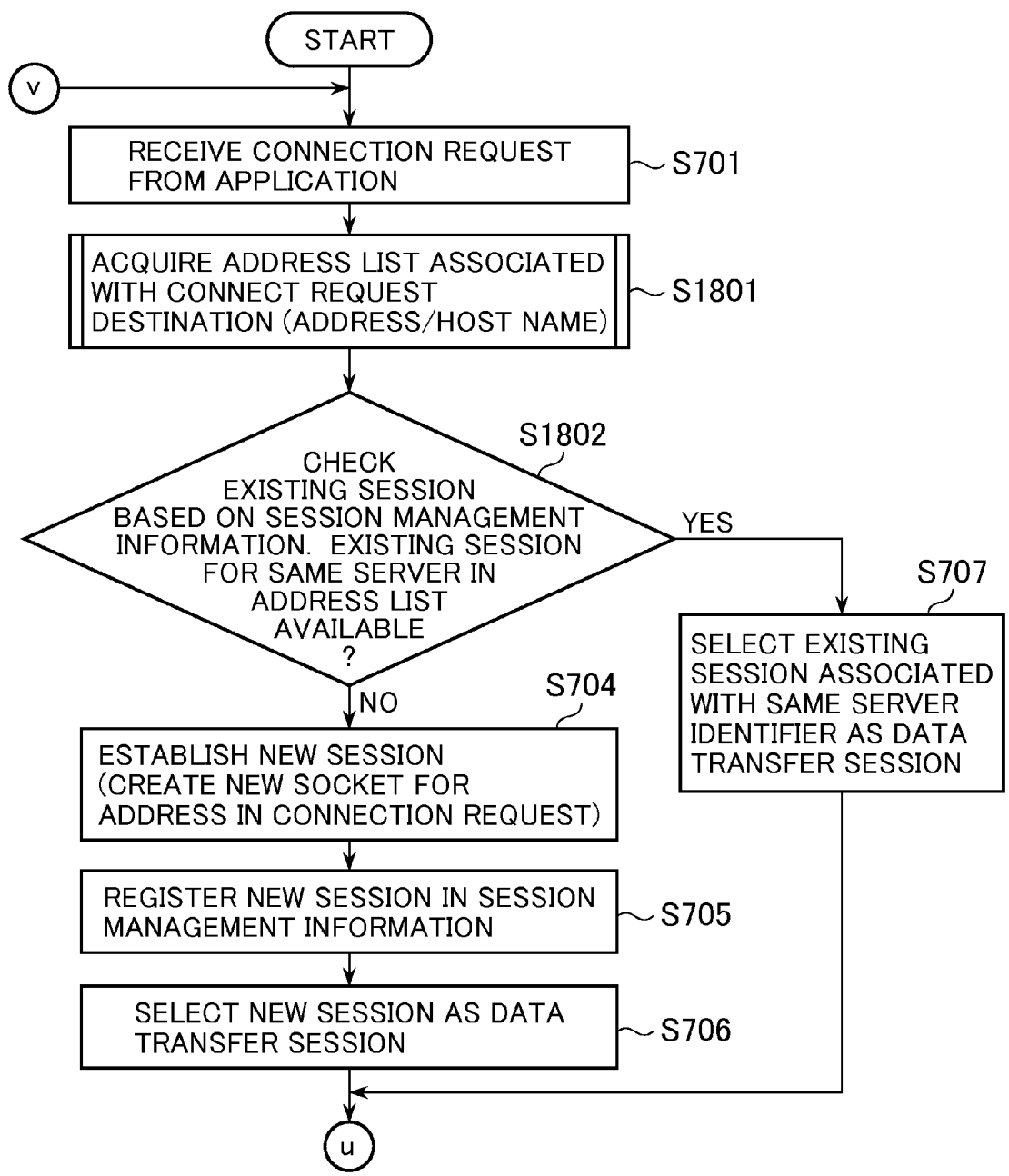
FIGS. 22A and 22B are flowcharts of a session management process executed in the sixth embodiment.
Figure 22B:
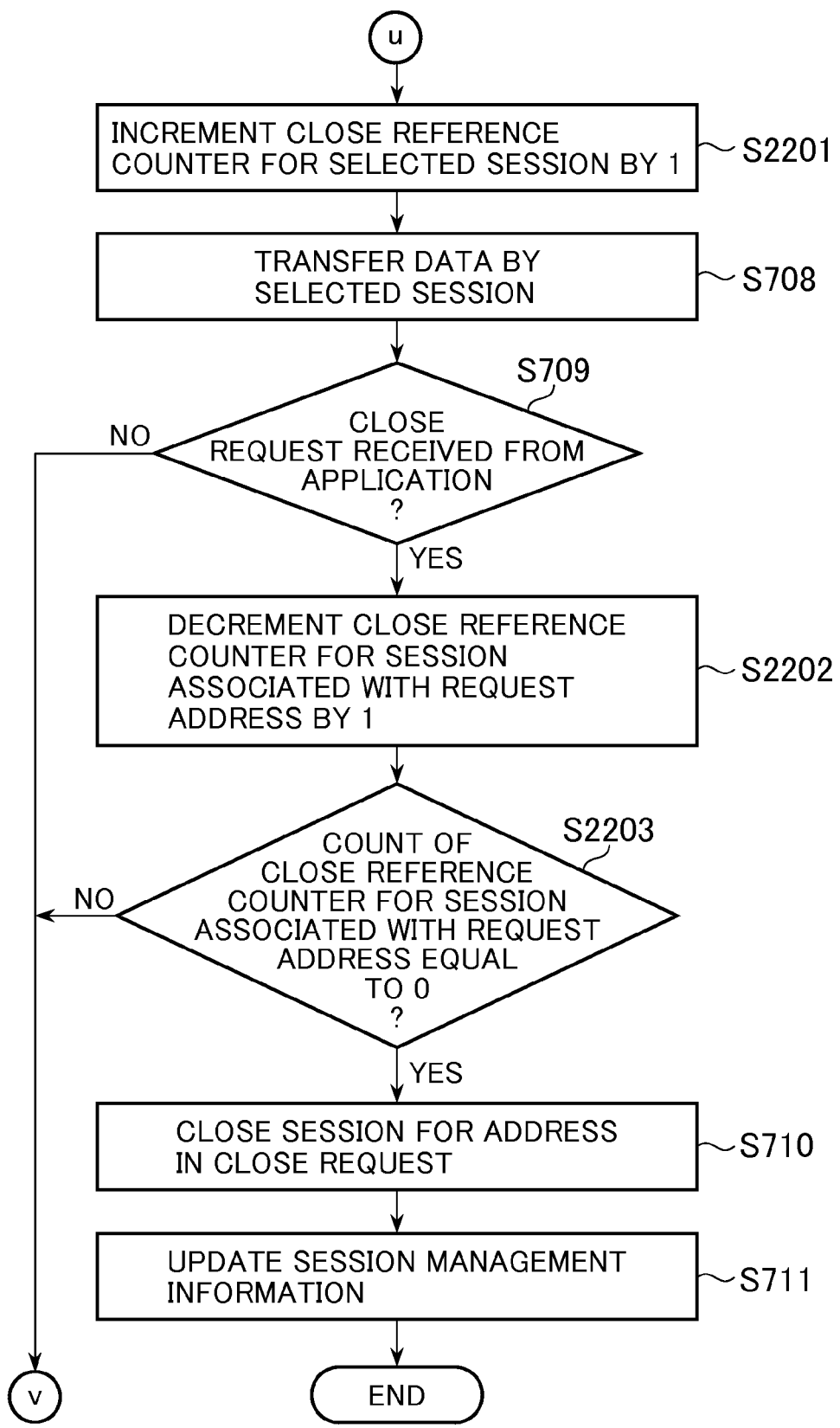

A session management process in the sixth embodiment will be described with reference to a flowchart shown in FIGS. 22A and 22B. The flowcharts shown in FIGS. 22A and 22B are partially identical to that in FIG. 18. Therefore, in FIGS. 22A and 22B, steps identical to those in FIG. 7 and FIG. 18 are denoted by identical step numbers, and description thereof is omitted. Hereafter, only different points from the fourth embodiment will be described.

In a step S2201 in FIG. 22B, under the control of the inter-process communication controller 401, the session disconnection management section 407 increments the count of a close reference counter for a session selected in the step S706 or S707 by 1. At this time, the session disconnection management section 407 stores the count of the close reference counter incremented by 1 in the connection reference count storage section 408.

Next, the inter-process communication controller 401 carries out data transfer by the session selected in the step S706 or S707 (step S708). Then, the inter-process communication controller 401 determines whether or not a close request from the client application 101 or 101a or a disconnection request from the communication library 104a has been received (step S709). If the close request or the disconnection request has not been received, the process returns to the step S701.

On the other hand, if either the close request or the disconnection request has been received, the session disconnection management section 407 decrements the count of the close reference counter for a session established for an address associated with the request by 1 (step S2202). As described above, for each destination address associated with a session, the session disconnection management section 407 increments the count of an associated close reference counter by 1 in response to a connection request for connection to the destination address, and decrements the same by 1 in response to a disconnection request.

Then, the inter-process communication controller 401 determines whether or not the count of the close reference counter has become equal to 0 (step S2203) due to decrement of the count of the close reference counter by 1. If the count of the close reference counter is not equal to 0, the process returns to the step S701.

On the other hand, if the count of the close reference counter is equal to 0, the process proceeds to the step S710, wherein the inter-process communication controller 401 carries out close processing for closing the session for the address associated with the close request or the disconnection request and the socket therefor.

As described above, according to the sixth embodiment, each session is not closed whenever a close request for the session is received, but closed based on a close reference counter provided for the session.

Therefore, in a case where different client applications use an identical session for data transfer, it is possible to prevent a disconnection instruction from one of the client applications from disabling data transfer by the other client application. This enables more efficient use of network resources, such as sockets.

In the first to sixth embodiments, when an existing session is available, communication is always performed using the existing session. However, in comparison with an existing session established for a first communication started earlier, a new session which is to be originally established for a second communication started later is sometimes superior in communication efficiency in terms of communication speed, the number of routers via which communication is performed, etc.

For this reason, a seventh embodiment of the present invention is configured such that even in a case where an available session exists, when a new session to be established by the present communication is superior in communication efficiency to the existing session, the new session is established to continue the communication.

Figure 24:
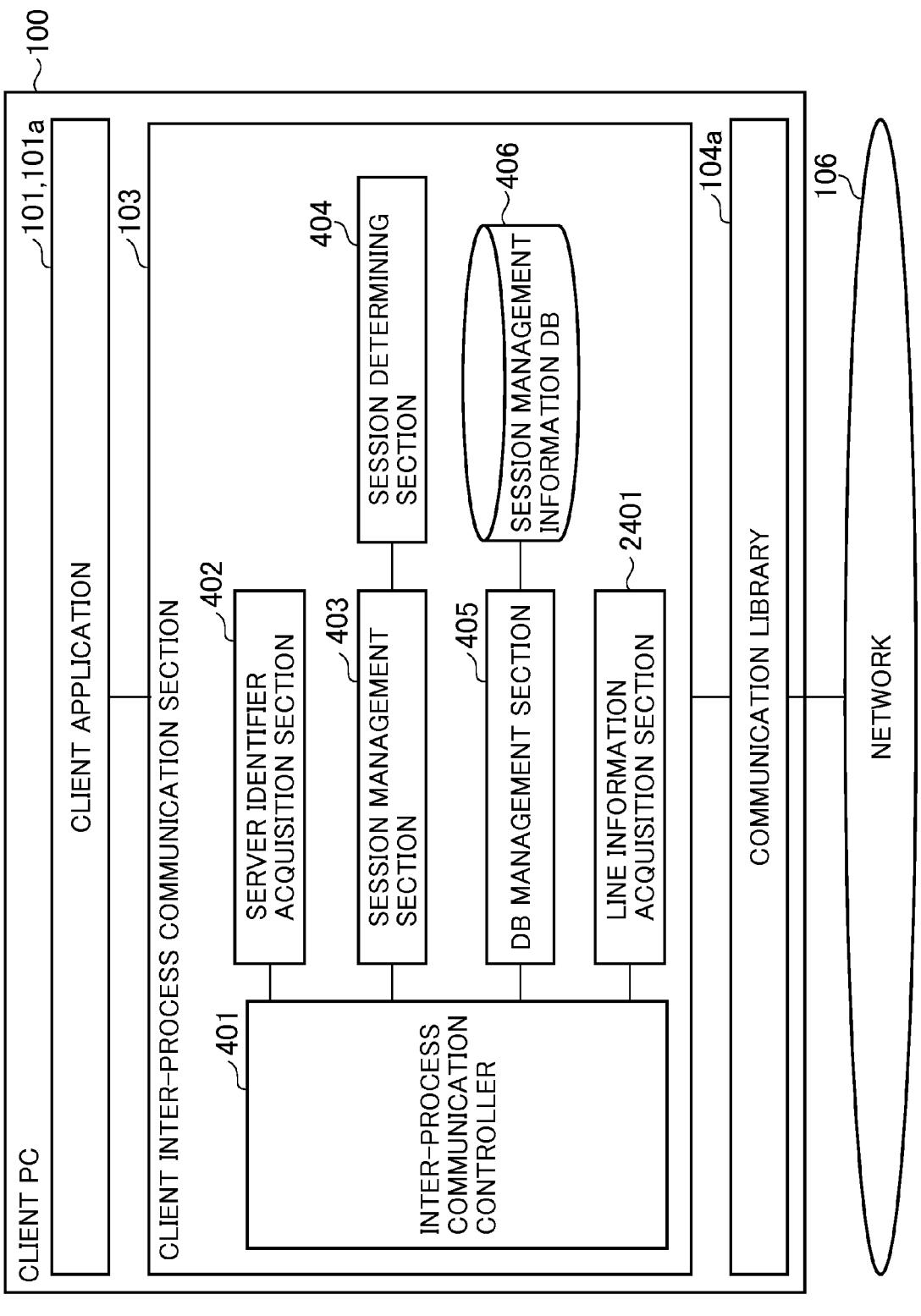
FIG. 24 is a block diagram showing in detail the software configuration of a client inter-process communication section of a client PC according to the seventh embodiment.

In the seventh embodiment, as shown in FIG. 24, the client inter-process communication section 103 is provided with a line information acquisition section 2401 for acquiring line information under the control of the inter-process communication controller 401, so as to determine the communication efficiency.

The other part of the software configuration of the client PC 100 is substantially identical to the corresponding part in the first embodiment shown in FIG. 4, and therefore the following description will be given only of different points. It should be noted that the session disconnection management section 407, the connection reference count storage section 408, and the session reconnection management section 409 in FIG. 4 are omitted from illustration in FIG. 24.

The line information acquisition section 2401 acquires line information on a communication route to a destination address on the network 106, from the communication library 104a. Then, the line information acquisition section 2401 registers the line information as session management information in the session management information DB 406 via the DB management section 405.

Line information acquired by the line information acquisition section 2401 includes Traffic Class, Flow Label, and Hop Limit of an IPv6 header, Service Type and Time To Live of an IPv4 header, and further a communication band.

The line information acquisition section 2401 is capable of detecting a Path MTU (Maximum Transmission Unit) using a Path MTU Discovery of the IP protocol. The Path MTU Discovery automatically detects the maximum value of a datagram transmittable by one-time data transfer. The Path MTU Discovery is defined by RFC (Request for Comments).

The line information acquisition section 2401 acquires Path MTU Discovery for IP version 6 defined in RFC 1981, Path MTU Discovery defined in RFC 1191, and the like, from the communication library 104a.

As for a communication band, the line information acquisition section 2401 can acquire band information on a network card mounted in the client PC 100. Further, the line information acquisition section 2401 can acquire band information on a band controlled by a client application, using a network control protocol defined in RFC 2205.

FIG. 25 is a diagram of session management information used in a session management system according to the seventh embodiment. This session management information is stored as a database in the session management information DB 406.

The FIG. 25 session management information used by the session management system according to the seventh embodiment is distinguished from the FIG. 5 session management information used by the session management system according to the first embodiment in that line information 2501 is added to the same data items as those of the FIG. 5 session management information. This line information 2501 indicates a line condition of a communication route to a destination address designated as a destination by the client application 101 or 101a when a connection thereto is requested, and an associated port number.

The line information 2501 includes band information 2501a, a router count 2501b, and Path MTU 2501c, for example. However, it is also possible to determine communication efficiency using line information other than these pieces of information.

Figure 26A:
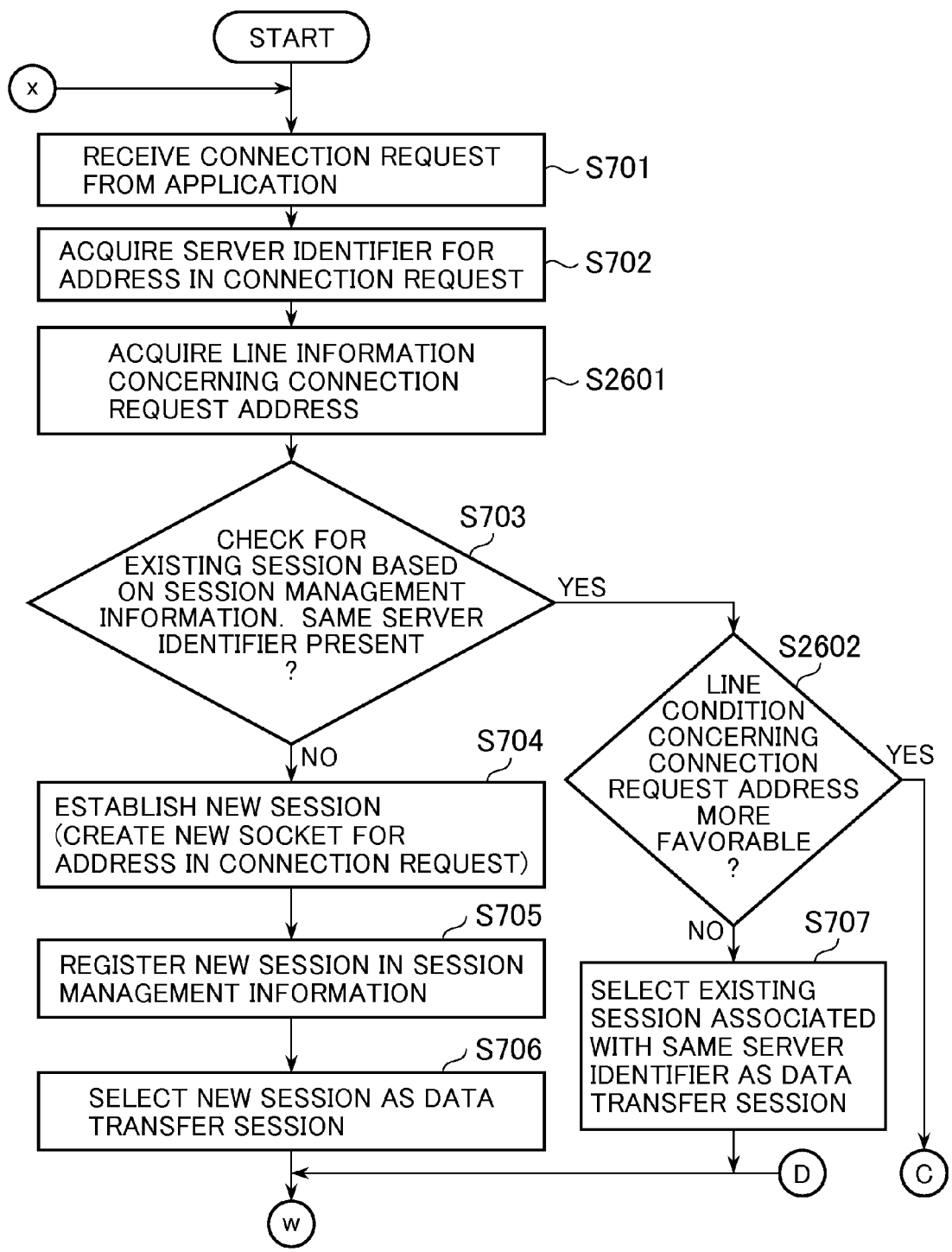

Next, the session management information by the session management system according to the seventh embodiment will be described with reference to a flowcharts shown in FIGS. 26A, 26B and 27. This flowchart includes a number of processing steps identical to those in the FIG. 7 flowchart in the first embodiment. These steps are denoted by the same corresponding step numbers, and description thereof is omitted.

In the step S702, the inter-process communication controller 401 acquires a server identifier from the server PC 105 according to a destination address designated by the client application 101 or 101a. Further, the inter-process communication controller 401 causes the line information acquisition section 2401 to acquire line information on a communication route to the destination address designated by the client application 101 or 101a (step S2601).

In this case, the line information acquisition section 2401 can acquire the information on the communication route from a socket library on an OS of the client PC 100 based on a getsockopt function. Further, the line information acquisition section 2401 can acquire Path MTU Discovery from the communication library 104a on the OS and then acquire Path MTU 2501c concerning the communication route using the Path MTU Discovery. The line information acquisition section 2401 can also acquire TTL (Time To Live) information in an IPv4 header or Hop Limit information in an IPv6 header.

Next, the inter-process communication controller 401 causes the session management section 403 to determine whether or not an existing session established in association with the server identifier 504 identical to that acquired in the step S702 is present (step S703).

In this case, the session management section 403 acquires session management information from the session management information DB 406 via the DB management section 405. Then, the session management section 403 determines, based on the acquired session management information, whether or not there is an existing session associated with the same server identifier 504 as that acquired when the present connection request is made among existing sessions currently in communication using other addresses. This determination processing is actually carried out by the session determining section 404.

When there is an existing session associated with the same server identifier 504 as that acquired in the step S702, the process proceeds to a step S2602.

In the step S2602, the inter-process communication controller 401 causes the session determining section 404 to determine, through comparison between a line condition of the existing session already connected and a line condition concerning the destination address designated in the present connection request, whether or not the latter is more favorable.

In the example of the session management information in FIG. 25, communications assigned respective Management Numbers 1 and 2 are based on connection requests issued from a client application to addresses which are different but are of servers having the same server identifier. When the two communications are compared in respect of Path MTU 2501c, Path MTU 2501c of Management Number 1 is 1500, while Path MTU 2501c of Management Number 2 is 9000. From this, it is determined that a line condition of Management Number 2 having a larger Path MTU (smaller communication overhead) is more favorable.

Further, when the two communications are compared in respect of the router count 2501b, the router count of Management Number 1 is 3, while the router count of Management Number 2 is 1. From this, it is determined that the line condition of Management Number 2, in which the number of routers via which communication is performed is smaller (i.e. communication overhead is smaller), is more favorable. A method of acquiring band information 2501a will be described in detail hereinafter.

Cases can be imagined in which results of determinations as to favorableness of the line condition by the respective methods based on the band information 2501a, the router count 2501b, and the Path MTU 2501c contradict each other, but in such cases, determination can be performed based on total communication overhead obtained by totalizing the results of the determinations.

Further, it is possible to determine favorableness of the line condition based on other communication conditions than the band information 2501a, the router count 2501b, and the Path MTU 2501c. For example, an ever-changing communication condition, such as traffic of a communication route, may be used. Furthermore, it is possible to determine favorableness of the line condition based on total communication overhead or the like obtained by weighing each of parameters including the band information 2501a, the router count 2501b, and the Path MTU 2501c, as designated by the user.

When the line condition concerning the destination address designated in the present connection request is more favorable than that concerning the already-connected existing session, the inter-process communication controller 401 causes the session management section 403 to establish a new session (step S2603). In this case, the session management section 403 creates a new socket based on the destination address designated by the client application 101 or 101a, using the communication library 104a.

Next, the session management section 403 causes the DB management section 405 to register information on the new session including the new socket in the session management information DB 406 (step S2604). Then, the inter-process communication controller 401 selects the new session established for the destination address designated by the client application 101 or 101a, as a session for the present data transfer (step S2605).

Next, the inter-process communication controller 401 changes the existing session with the same server with which communication has been performed for data transfer, to the new session (step S2606). Then, the inter-process communication controller 401 deletes the existing session from the session management information DB 406 (step S2607).

In the example of the session management information in FIG. 25, as for communications of respective Management Numbers 3 and 2, the communication of Management Number 2 is in a more favorable line condition. Let it be assumed that in this line condition, the client application 101 issues connection requests in the order of Management Numbers 3 and 2.

In this case, first, a session indicated by Management Number 3 is created anew. In this session, a communication address to which the client application 101 actually performs data transfer is [2001::20] with Port Number 1025.

Then, if the client application 101a issues a connection request of Management Number 2, since the line condition of Management Number 2 is more favorable than that of Management Number 3, a session for Management Number 2 is created anew.

Then, steps S2605 to S2607 are executed, whereby subsequent data transfers by the client applications 101 and 101a are carried out using the new session of Management Number 2 for the communication address [2001::20] with Port Number 1025.

When the line condition of the already-connected existing session is more favorable than that concerning the destination address designated anew, the process proceeds to the step S707. In the step S707, the inter-process communication controller 401 selects the already-connected existing session associated with the same server identifier 504 as that acquired as a response to the connection request in the present loop, as a session for the present data transfer.

Next, a description will be given of the method of acquiring the band information 2501a included in the line information 2501. The band information 2501a is acquired by the line information acquisition section 2401 in the step S2601 in FIG. 26A, according to a destination address designated by the client application 101 or 101a.

In this case, the line information acquisition section 2401 acquires LinkSpeed, which indicates a speed of linking to the destination address from a sender's address, of a network adaptor of the client PC 100 from the socket library on the OS of the client PC 100, by a LinkSpeed acquisition function.

It should be noted that the line information acquisition section 2401 can acquire a network control protocol for realizing QOS (Quality of Service) of network equipment from the socket library on the OS to thereby recognize the band information 2501a. In this case, the line information acquisition section 2401 acquires RSVP (Resource Reservation Protocol) (RFC 2205) settings from the network control protocol.

The line information acquisition section 2401 checks these settings and acquires the LinkSpeed of the network adaptor of the client PC 100 and information on the usage bandwidth of a network device on the communication path to thereby determine favorableness of the line condition.

Then, the client inter-process communication section 103 totally determines the band information 2501a, the router count 2501b, and the Path MTU 2501c to thereby select an address for use in performing data transfer by the session established for a different address. Then, the client inter-process communication section 103 selects a session for the selected address as a session for use in actual data transfer.

In determining favorableness of a line condition, it is not necessarily required to use all of the band information 2501a, the router count 2501b, and the Path MTU 2501c. One or a desired combination of two of these may be used to determine favorableness of the line condition.

The present invention may be applied to a system comprising a plurality of apparatuses or a unit formed by a single apparatus. Further, although in each of the above described embodiments, it is assumed that IPv6 is mainly used as a communication protocol, the technical ideas according to the embodiments can also be applied to a case where any other communication protocol is used which can assign a plurality of addresses to a single node or the like.

It is to be understood that the present invention may also be accomplished by supplying a system or an apparatus with a storage medium in which a program code of software, which realizes the functions of any of the above described embodiments, is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and function.

This application claims priority from Japanese Patent Application Nos. 2008-098363 filed Apr. 4, 2008, and 2009-002433 filed Jan. 8, 2009 each of which is hereby incorporated by reference herein in its entirety.

What is claimed is:

1. An information processing apparatus that can communicate with an external apparatus having at least a first address and a second address, the information processing apparatus comprising:
a processing device;
an accepting unit configured to accept a connection request with an address designated as a connection destination; and
a control unit configured to control, when said accepting unit accepts a connection request with the first address designated as the connection destination, the information processing apparatus so as to establish a first session with the first address designated as the connection destination, and to control, when said accepting unit accepts a connection request with the second address designated as the connection destination and the information processing apparatus has established the first session, the information processing apparatus so as to use the first session which has already been established,
wherein said units are implemented at least in part by the processing device.

2. The information processing apparatus according to claim 1, wherein when said accepting unit accepts the connection request with the second address designated as the connection destination and the information processing apparatus has established the first session, said control unit is configured to control the information processing apparatus so as to establish a second session, which is different than the first session, designating the second address as the connection destination, so long as the second session satisfies a predetermined condition.

3. The information processing apparatus according to claim 2, wherein said control unit is configured to control, so long as the second session is better in communication efficiency than the first session, the information processing apparatus so as to establish the second session.

4. The information processing apparatus according to claim 3, wherein the communication efficiency is determined based on at least one of band information, a router count, and Path MTU.

5. The information processing apparatus according to claim 1, wherein when said accepting unit accepts the connection request with the second address as the connecting destination and the information processing apparatus has not established the first session, said control unit is configured to control the information processing apparatus so as to establish a second session, which is different than the first session, with the second address designated as the connection destination.

6. The information processing apparatus according to claim 1, wherein when the accepting unit accepts the connection request with the second address as the connection destination and the information processing apparatus has established the first session, the information processing apparatus is configured to not establish a second session with the second address designated as the connection destination.

7. An information processing method of causing an information processing apparatus to communicate with an external apparatus having at least a first address and a second address, the information processing method comprising:

an accepting step of accepting a connection request with an address designated as a connection destination; and a control step of controlling, when a connection request with the first address designated as the connection destination is accepted in said accepting step, the information processing apparatus so as to establish a first session with the first address designated as the connection destination, and to control, when a connection request with the second address designated as the connection destination is accepted in said accepting step and the information processing apparatus has established the first session, the information processing apparatus so as to use the first session, which has already been established, wherein said steps are implemented at least in part by a data processing device of the information processing apparatus.

8. A non-transitory computer readable storage medium storing a program configured to be executed at least by a processing device of an information processing apparatus that can communicate with an external apparatus having at least a first address and a second address, the program comprising:

an accepting module configured to accept a connection request with an address designated as a connection destination; and a control module configured to control, when a connection request with the first address designated as the connection destination is accepted according to the accepting module, the information processing apparatus so as to establish a first session with the first address designated as the connection destination, and to control, when a connection request with the second address designated as the connection destination is accepted according to the accepting module and the information processing apparatus has established the first session the information processing apparatus so as to use the first session, which has already been established.

* * * * *